(12) United States Patent
Dean et al.

(10) Patent No.: US 8,371,238 B2
(45) Date of Patent: *Feb. 12, 2013

(54) SECTIONAL METER SHUT-OFF AND AGRICULTURAL IMPLEMENT HAVING SECTIONAL METER SHUT-OFF

(75) Inventors: Brian F. Dean, Langbank (CA); Patrick M. Beaujot, Langbank (CA); David R. Duke, Langbank (CA); Bruce W. Wilton, Langbank (CA); Barry K. Melanson, Kennedy (CA); Justin C. Varjassy, Langbank (CA); Ward J. Hepting, Regina (CA); Dave Hundeby, Saskatoon (CA)

(73) Assignee: One Pass Implements Inc., Langbank (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,955

(22) Filed: Feb. 7, 2012

(65) Prior Publication Data

US 2012/0132115 A1 May 31, 2012

Related U.S. Application Data

(60) Division of application No. 12/615,215, filed on Nov. 9, 2009, which is a continuation-in-part of application No. 12/037,732, filed on Feb. 26, 2008, now Pat. No. 7,690,440.

(51) Int. Cl.
*A01C 7/00* (2006.01)
*A01C 9/00* (2006.01)
*A01C 15/00* (2006.01)

(52) U.S. Cl. ......... 111/179; 111/182; 111/200; 111/900

(58) Field of Classification Search .......... 111/177–182, 111/170, 200, 900; 342/357.07
See application file for complete search history.

(56) References Cited

U.S. PATENT DOCUMENTS

| | | | |
|---|---|---|---|
| 3,784,100 | A | 1/1974 | Kirschmann |
| 3,935,907 | A | 2/1976 | Riet |
| 4,109,928 | A | 8/1978 | Watkins |
| 4,127,283 | A | 11/1978 | Baden |
| 4,157,735 | A | 6/1979 | Olsson et al. |
| 4,260,107 | A | 4/1981 | Jackson |

(Continued)

FOREIGN PATENT DOCUMENTS

| | | |
|---|---|---|
| CA | 1275986 | 11/1990 |
| CA | 2111611 | 6/1995 |

(Continued)

OTHER PUBLICATIONS

"Seedmaster Prepares to Launch Overlap Control Technology". The Master Seeder Your Precision Seeding Newsletter. vol. 5, Issue 2, Winter 2009, p. 3.

(Continued)

*Primary Examiner* — Christopher J. Novosad
(74) *Attorney, Agent, or Firm* — Bennett Jones LLP

(57) ABSTRACT

An assembly for selectively supplying particulate material to an air seeder, an agricultural implement able to selectively supply and dispense particulate material into the ground and a method of selectively dispensing particulate material into the ground are provided. The assembly has at least one supply receptacle for receiving particulate material from a source and a metering roller for supplying the material to an air seeder. The assembly is operative to selectively supply the material to the air seeder and prevent the material from being supplied to the air seeder. The implement can use the assembly to selectively supply particulate material to ground engaging openers where the particulate material will be dispensed into the ground. Particulate material can be selectively supplied to the implement when it is desired to have the particulate material dispensed into the ground and then prevented from being supplied to the implement when it is not desirable.

8 Claims, 22 Drawing Sheets

U.S. PATENT DOCUMENTS

Figure 1:
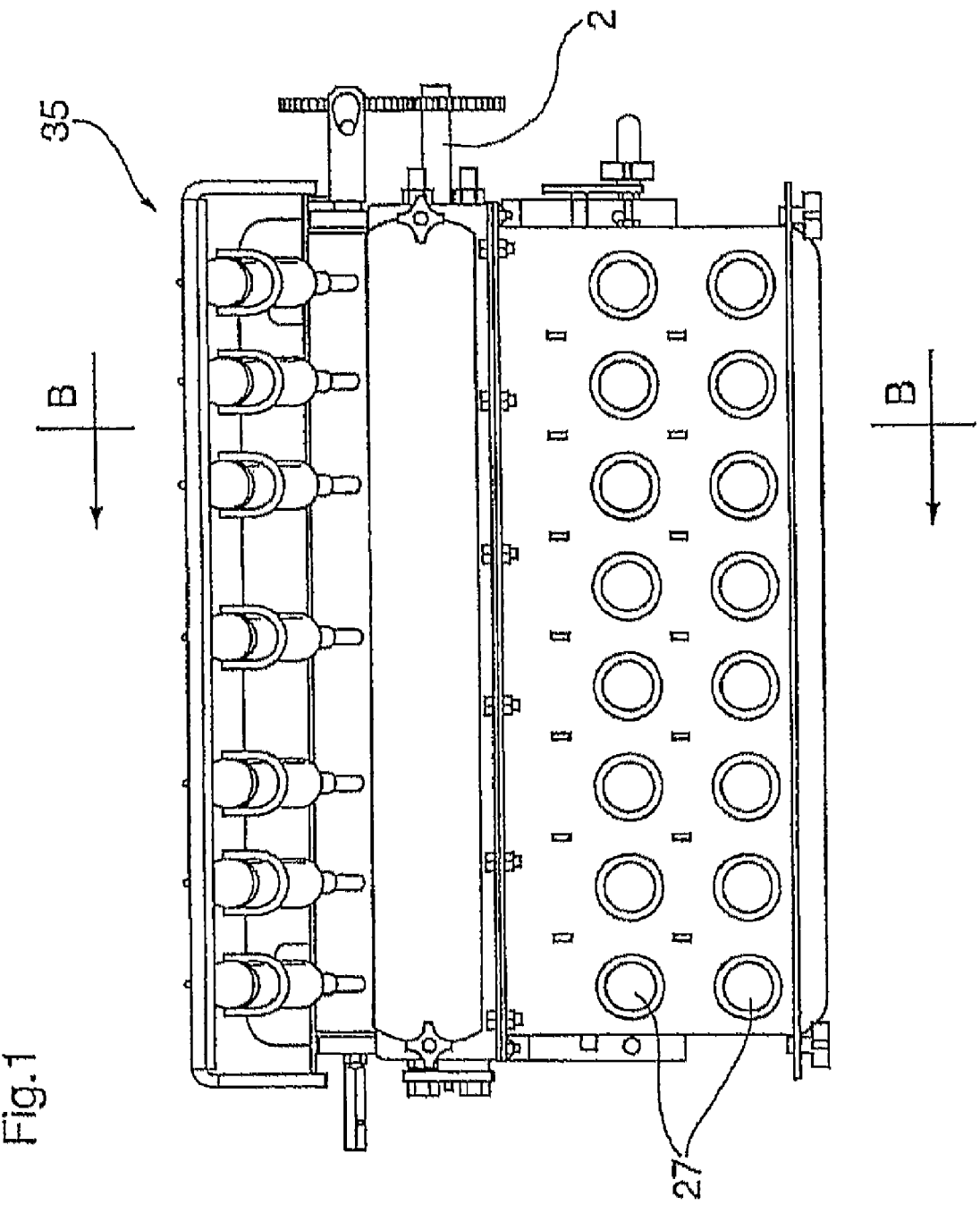
Figure 2:
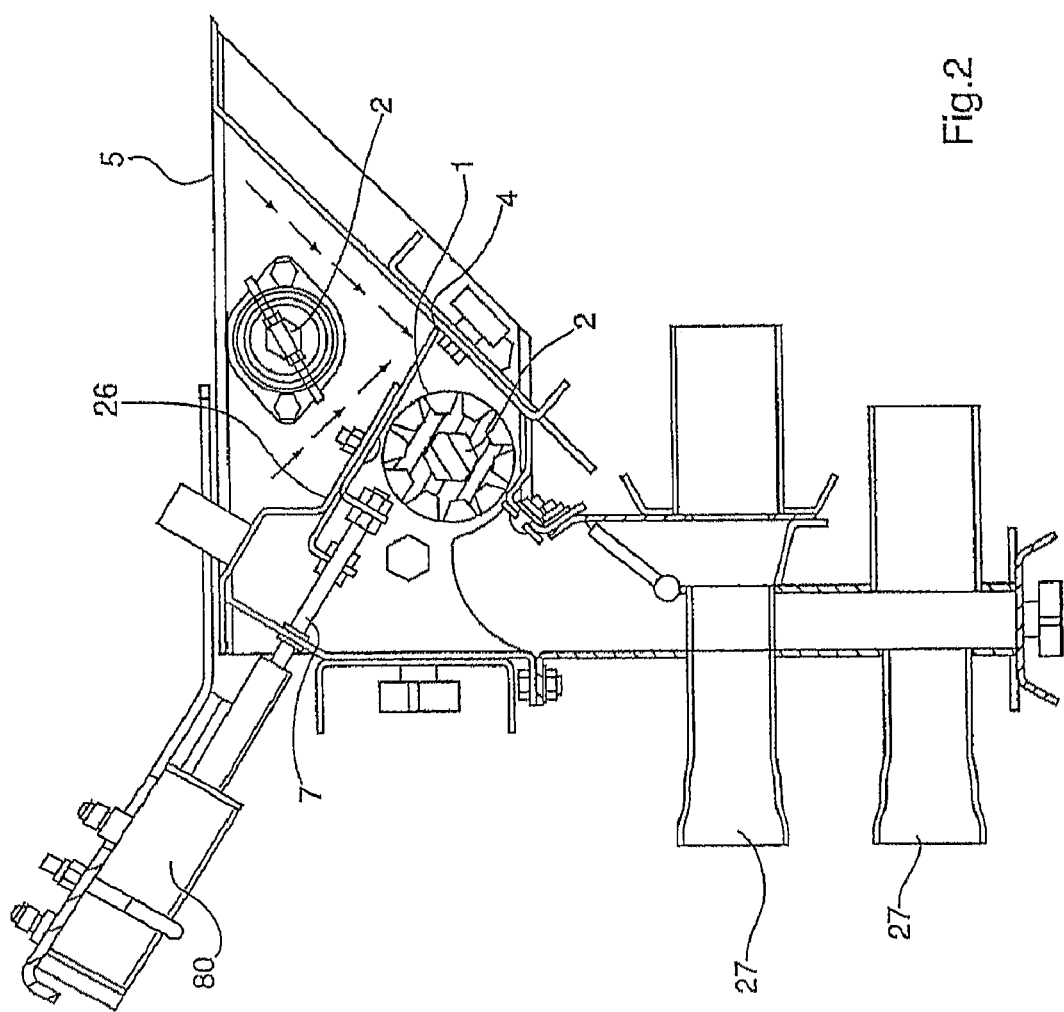
Figure 3:
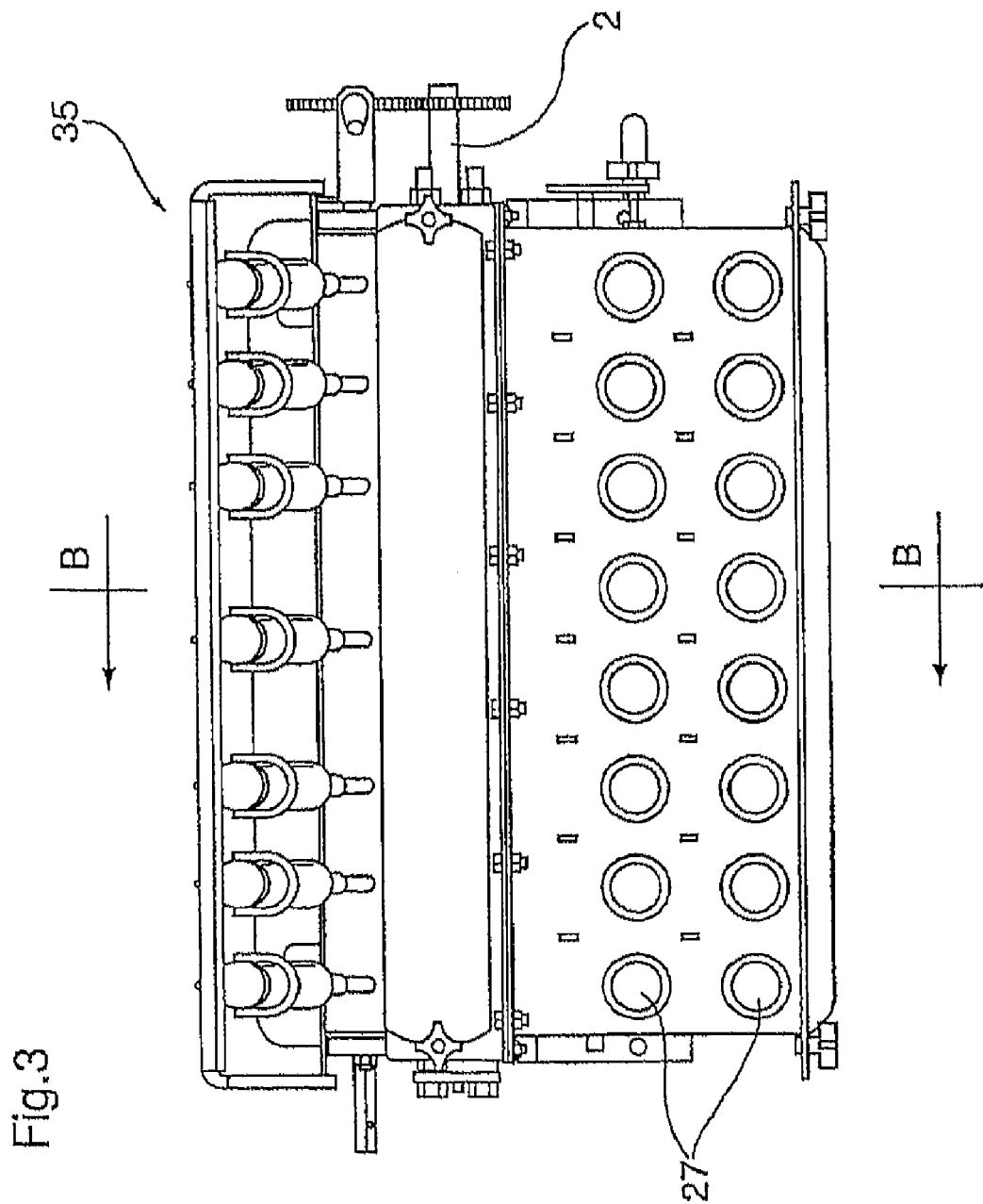
Figure 4:
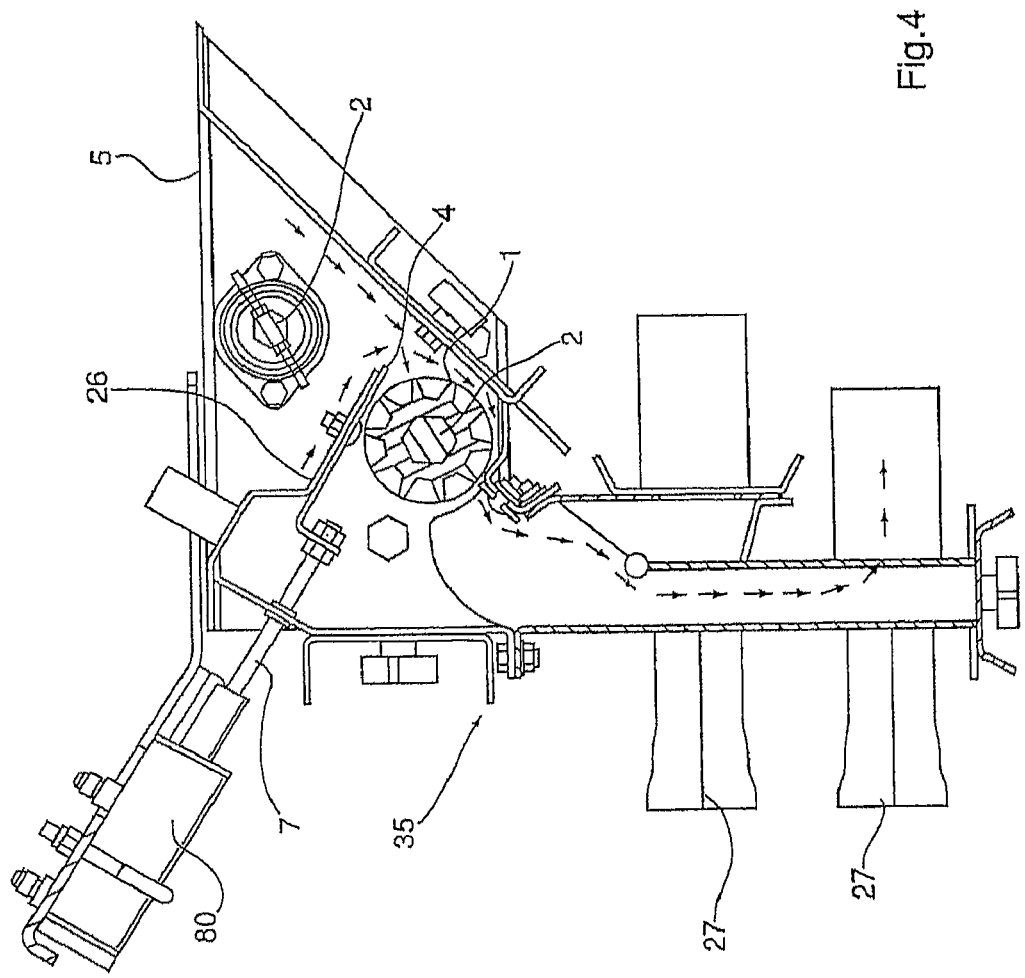
Figure 5:
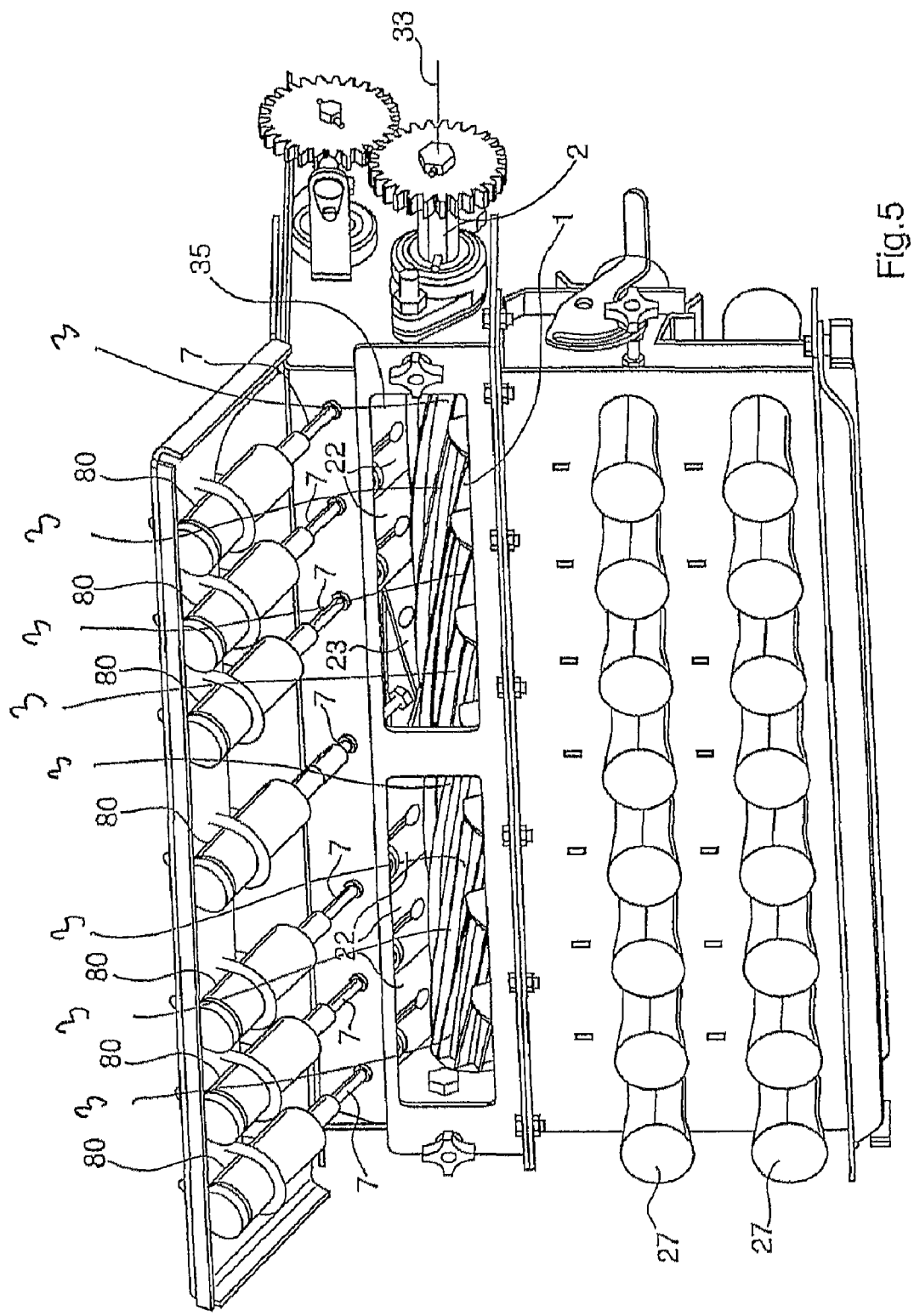
Figure 6:
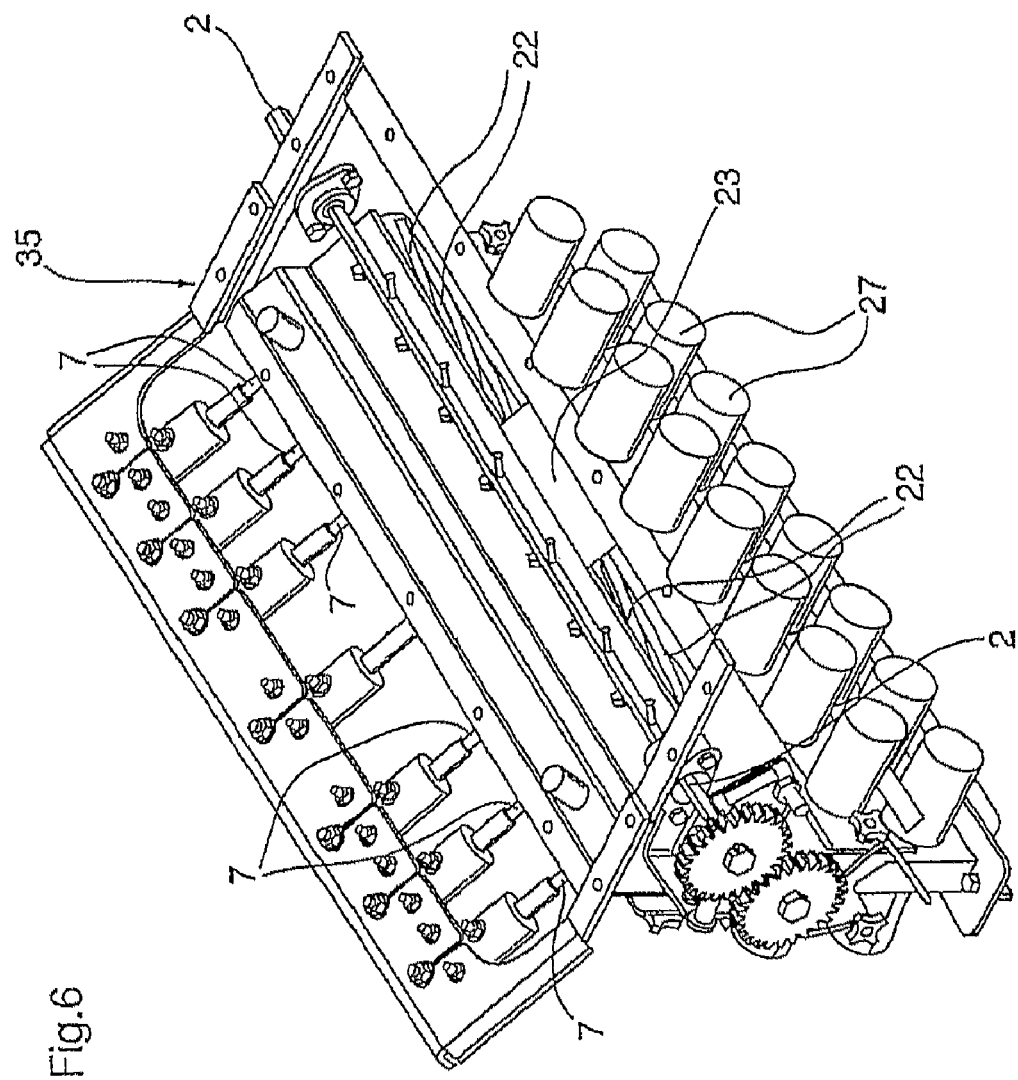
Figure 7:
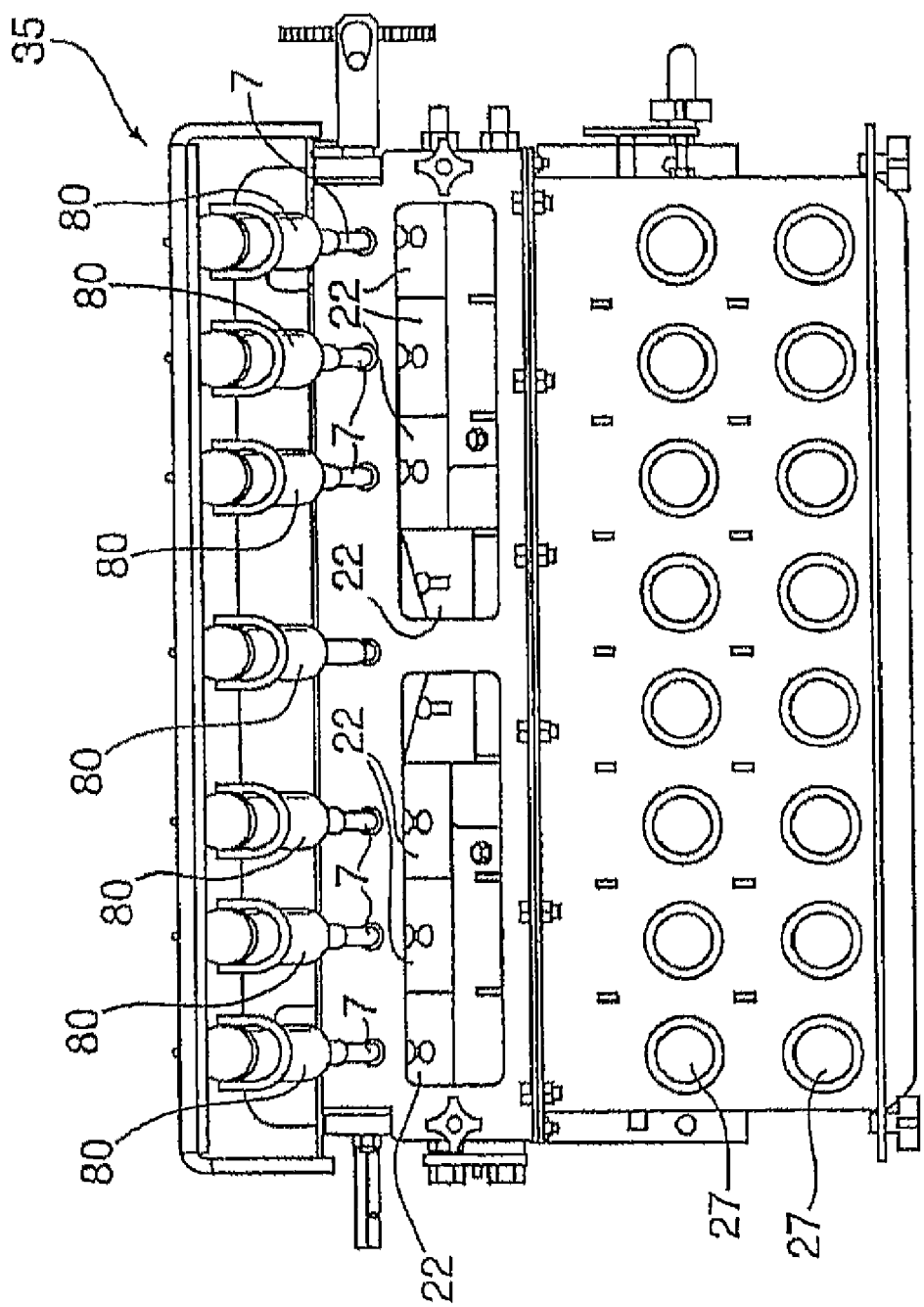

| | | | |
|---|---|---|---|
| 4,360,215 | A | 11/1982 | Nohl et al. |
| 5,028,009 | A | 7/1991 | Takata |
| 5,220,876 | A | 6/1993 | Monson et al. |
| 5,232,054 | A | 8/1993 | Van Blaricon et al. |
| 5,265,898 | A | 11/1993 | Houck |
| 5,337,959 | A | 8/1994 | Boyd |
| 5,363,924 | A | 11/1994 | Foley et al. |
| 5,394,812 | A | 3/1995 | Dunning et al. |
| 5,453,924 | A | 9/1995 | Monson et al. |
| 5,605,105 | A | 2/1997 | Clark et al. |
| 5,737,221 | A | 4/1998 | Newton |
| 5,751,576 | A | 5/1998 | Monson |
| 5,772,114 | A | 6/1998 | Hunter |
| 5,787,988 | A | 8/1998 | Harlan et al. |
| 5,884,224 | A | 3/1999 | McNabb et al. |
| 5,913,915 | A | 6/1999 | McQuinn |
| 5,919,242 | A | 7/1999 | Greatline et al. |
| 5,924,371 | A | 7/1999 | Flamme et al. |
| 5,971,294 | A | 10/1999 | Thompson et al. |
| 5,980,163 | A | 11/1999 | Gregor et al. |
| 6,076,613 | A | 6/2000 | Frasier |
| 6,079,340 | A | 6/2000 | Yamamoto |
| 6,089,743 | A | 7/2000 | McQuinn |
| 6,189,807 | B1 | 2/2001 | Miller et al. |
| 6,199,000 | B1 | 3/2001 | Keller et al. |
| 6,216,614 | B1 | 4/2001 | Wollenhaupt |
| 6,522,948 | B1 | 2/2003 | Benneweis |
| 6,678,580 | B2 | 1/2004 | Benneweis |
| 6,776,355 | B2 | 8/2004 | Ringer et al. |
| 6,810,315 | B2 | 10/2004 | Cessac |
| 6,813,544 | B2 | 11/2004 | Hood et al. |
| 6,877,675 | B2 | 4/2005 | Benneweis |
| 6,997,120 | B2 | 2/2006 | Gabriel |
| 7,374,029 | B1 | 5/2008 | Dillman |
| 7,395,769 | B2 | 7/2008 | Jensen |
| 2003/0187560 | A1 | 10/2003 | Keller et al. |
| 2009/0079624 | A1 | 3/2009 | Dean et al. |

FOREIGN PATENT DOCUMENTS

| | | |
|---|---|---|
| CA | 2151020 | 6/1996 |
| CA | 2311698 | 12/2001 |
| CA | 2503174 | 4/2006 |
| CA | 2566248 | 9/2007 |

OTHER PUBLICATIONS

Evaluation Report 302 Versatile Noble 2000 Seed Drill. Prairie Agricultural Machinery Institute (PAMI). Jun. 1983. ISSN 0383-3445.

Evaluation Report 303 International Harvester 7200 Stubble Mulch Press Drill. Prairie Agricultural Machinery Institute (PAMI). Jun. 1983. ISSN 0383-3445.

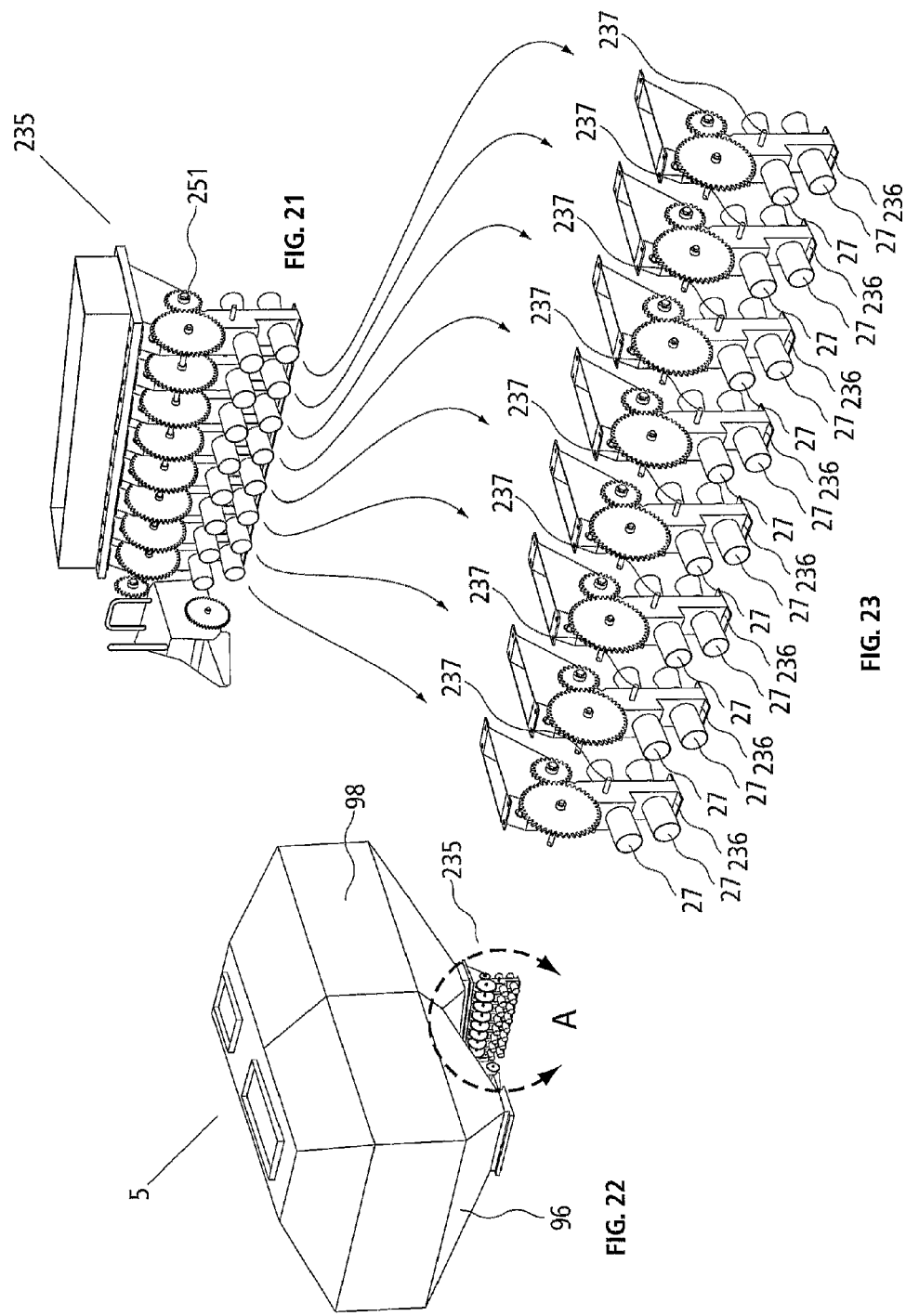

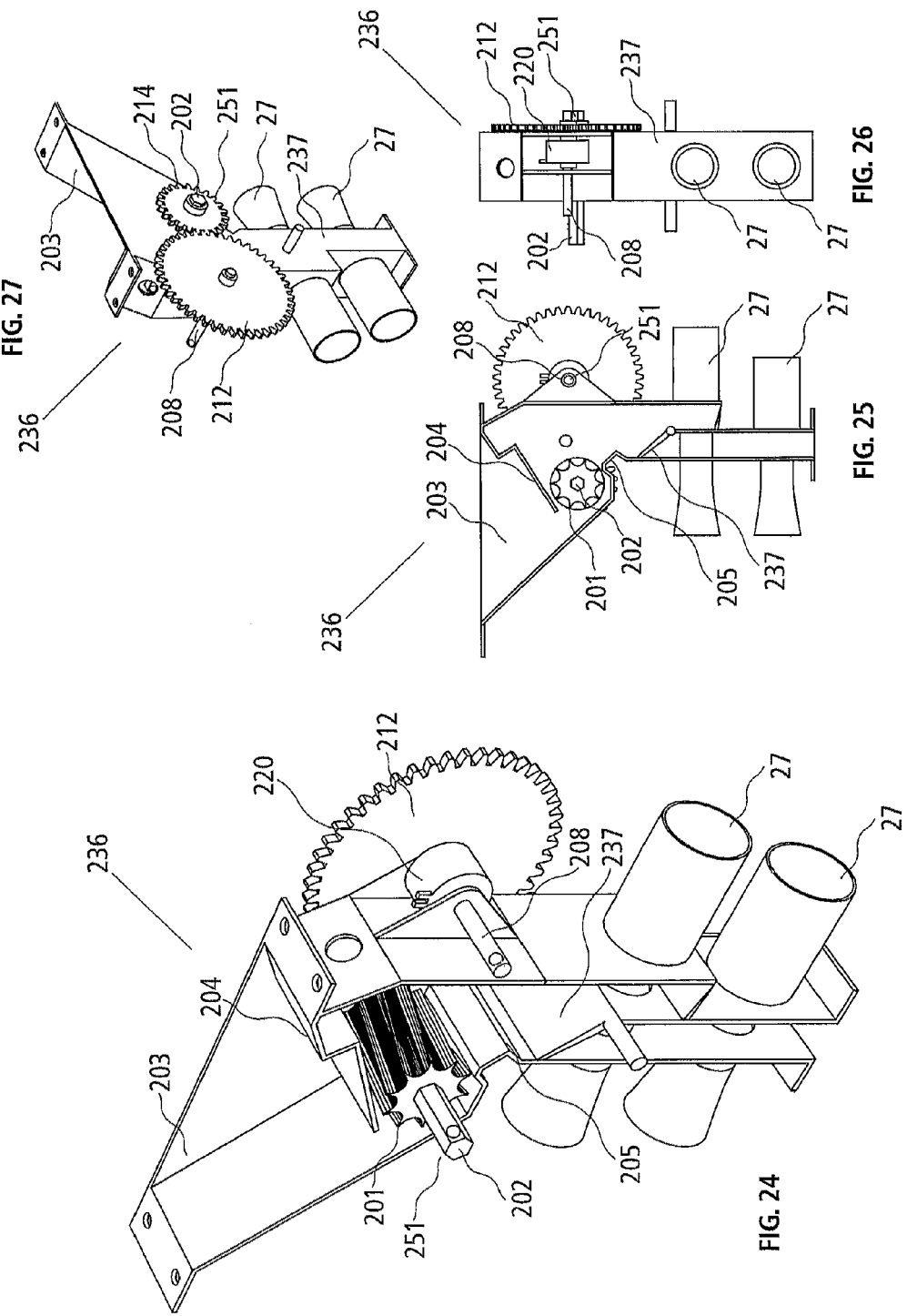
FIGURES 24, 25, 26, and 27

SECTIONAL METER SHUT-OFF AND AGRICULTURAL IMPLEMENT HAVING SECTIONAL METER SHUT-OFF

This application is a divisional application of U.S. application Ser. No. 12/615,215 filed Nov. 9, 2009, which is presently pending. U.S. application Ser. No. 12/615,215 is a Continuation-in-Part of U.S. patent application Ser. No. 12/037,732, filed Feb. 26, 2008, now U.S. Pat. No. 7,690,440 issued Apr. 6, 2010.

The present invention relates generally to the field of air seeding systems, and more particularly to metered air seeding and/or fertilizing systems.

BACKGROUND OF THE INVENTION

Air seeders/fertilizer apparatus are commonly used in agricultural operations to apply particulate materials including one or more of the following, namely seed, fertilizer and/or innoculants into soil during the planting operation. These apparatus are often comprised of a wheeled cart that includes one or more tanks and meters to both hold and meter particulate materials. The metered particulate material is delivered to the soil through pneumatic pipes that attach to ground-engaging openers which engage soil and permit delivery of particulate material such as seed or fertilizer to furrows which are created in such soil by the ground-engaging openers.

Historically, farm sizes have increased and likewise field sizes have increased. As Such, the necessary seeding/fertilizing equipment has become larger and more efficient. However, larger equipment proves to be difficult when attempting to seed/fertilize a smaller piece of land within a larger piece of land, or a piece of land with an irregular shape such as a triangle. When seeding, these land irregularities create a significant overlap in the area of soil being seeded and/or fertilized. As a result, the cost expended on seed and fertilizer is in excess of what is necessary for proper seeding and fertilizing. Additionally, over-fertilization and/or over-seeding of an area causes the crop to lodge and not ripen at the appropriate time causing harvest problems and losses in yield. The accumulative effect of the seeding and fertilizing overlapping in small sections over many fields can become a very significant expense to a farmer.

Prior art implements have sought to remedy this situation by implementing a metering device in the seeder that can apply a specific quantity of seed per linear distance. However, the prior art has not resolved the problem that double seeding can occur when the land seeded is too narrow or odd shaped for the seeding device. Further, the prior art has not resolved the problem that even though the meter has been turned off, ground-engaging openers are still engaging the ground and destroying the seed bed. This causes the seeded area which is overlapped to be destroyed by the ground-engaging openers resulting in uneven germination causing further problems with a poor crop and an uneven harvest in these areas.

Canadian Patent 2,503,174 provides for a multi-compartment air seeding system where each compartment is assigned to a selected air stream based on the volume or type of seed and fertilizer required for a specific crop. A metering assembly is provided which comprises a metering house 80 for receiving the seed or fertilizer material as well as a metering roller for metering the material. Metering cells then collect the material for seeding. Diverter plates are also provided to move front and backwards to open and close the tops of either the front and rear material cells.

U.S. Pat. No. 5,980,163 further provides a distribution manifold for an air seeder for dispensing product, Further, it provides by-passed ports and venturi ports, the venturi ports making up the row of ports in which product from the product tank associated with the primary distribution manifold is to be deposited. The by-pass ports make up the remainder of rows in the primary distribution manifold. If the venturi ports do not make up the top row of ports in the primary distribution manifold, product from the associated product tank flows through rows of by-pass ports until the product encounters a row of venturi ports. Following entering into the venturi ports, product is carried by the pneumatic distribution system to the tillage. This device promotes a smooth flow of metered product as well as allowing the operator to adapt the pneumatic distribution system for varying configurations.

Although both of the above prior art devices disclose air seeders that allow for metered seeding or fertilizing, neither of the above devices disclose a device that is both able to selectively obstruct a portion of the meter, as well as lift the corresponding ground-engaging openers, thus, preventing double seeding and the destruction of the seed bed.

Consequently, there is a need for an air seeding system that can combine the closing of part of the meter and lifting the corresponding ground-engaging opener.

SUMMARY OF THE INVENTION

The present invention overcomes the problems associated with the prior art air seeding systems and devices, by providing a metering assembly capable of restricting flow to selected ground-engaging members of an agricultural implement used in dispensing material such as seed and/or fertilizer to soil.

In an embodiment, a particulate material metering assembly for receiving a particulate material from an air seeding supply source and supplying and metering the particulate material to an air seeding apparatus is provided. The assembly comprises: at least one supply receptacle for receiving particulate material from the air seeding supply source, the supply receptacle having an opening for receiving particulate material from the air seeding supply source and a lower portion where particulate material is supplied from the at least one supply receptacle to the air seeding apparatus; a metering roller having at least one roll section, the at least one roll section provided in the at least one supply receptacle between the opening and the lower portion and rotatable to meter and supply particulate material from the at least one supply receptacle; and at least one flow stopping device for selectively preventing particulate material from being supplied from the at least one supply receptacle to the air seeding apparatus.

In another embodiment, an agricultural implement for injecting particulate material into soil is provided. The agricultural implement towable behind a vehicle and comprises: an air seeding supply source for supplying particulate material; a central frame; a plurality of elongate pivotable mounting arms, pivotably mounted at a proximal end thereof to said central frame, each adapted to be moved from a raised transport position to a lowered operating position, arranged in juxtaposed position and all aligned substantially parallel to each other along a longitudinal axis of said implement and in an intended direction of travel of said implement; ground engaging openers, mounted on each of said mounting arms intermediate a distal and said proximal end thereof, to engage soil when each of said mounting arms is in the operating position; material dispensing devices on each of said mounting arms, proximate the openers, for dispensing the particulate material into the soil; and a particulate material metering assembly operative to selectively supply and meter the particulate material from the supply source to the material dispensing devices on each of the mounting arms.

In another embodiment a method for selectively supplying particulate material to an air seeding apparatus for dispensing the particulate material in soil is provided. The method comprises: feeding particulate material from an air seeder supply source to a particulate material metering assembly; supplying and metering the particulate material from the air seeding supply source to the air seeding apparatus using the metering assembly; stopping the metering assembly from supplying particulate material to the air seeding apparatus when the air seeding apparatus is traveling over ground where it is undesirable to dispense particulate material; and after the metering assembly has been stopped from supplying particulate material to the air seeding apparatus and when the air seeding apparatus is again traveling over ground where it is desired to dispense particulate material, using the metering device to supply particulate material to the air seeding.

Figure 8:
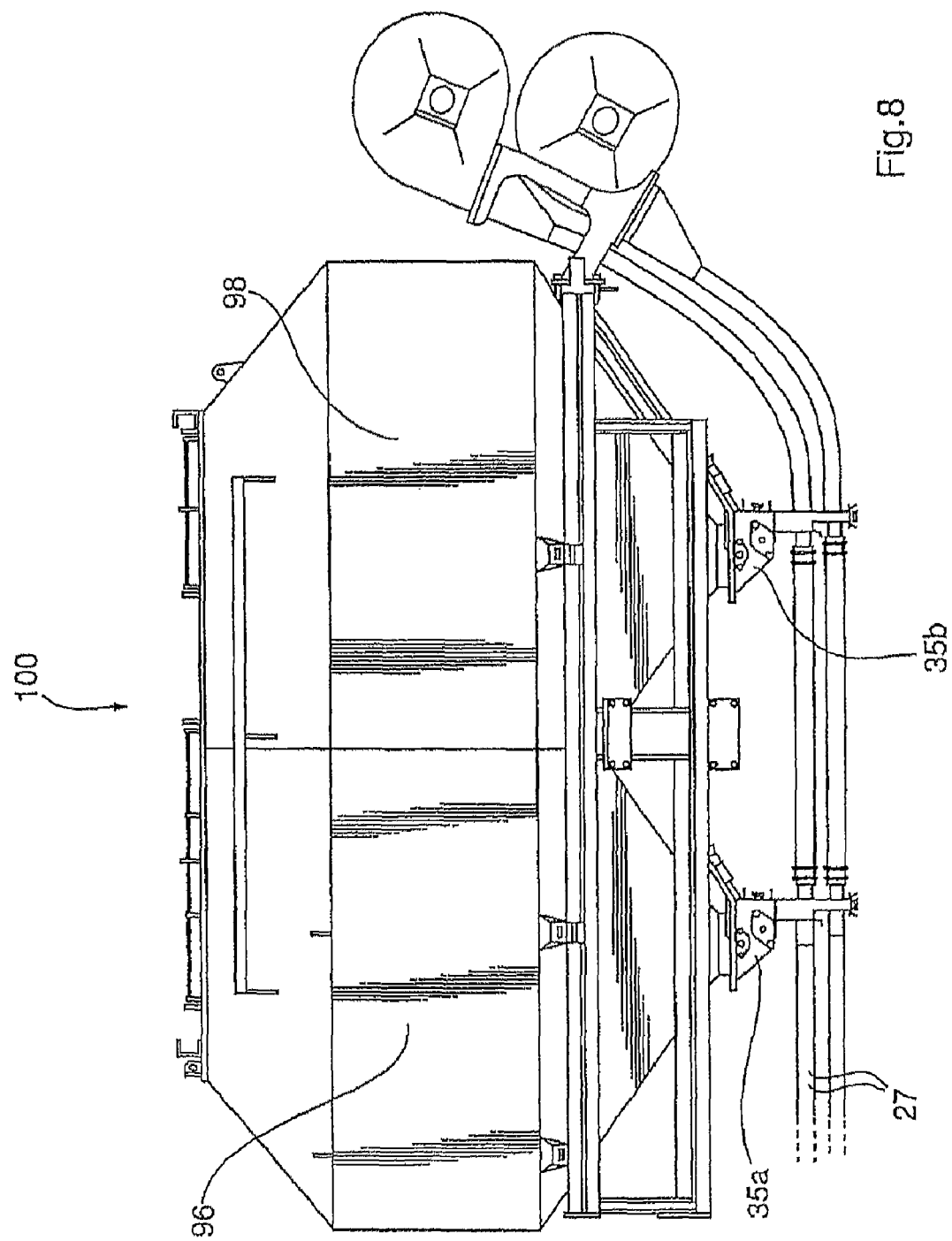

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 1. is a front view of a metering assembly as per one embodiment of the present invention;

FIG. 2. is an enlarged cross-sectional view of the metering assembly of FIG. 1, taken along line B-B of FIG. 1, showing the shut-off gates in the closed position;

FIG. 3. is a front view of a metering assembly of the present invention, similar to FIG. 1;

FIG. 4. is an enlarged cross-sectional view of the metering assembly of FIG. 3, taken along line B-B thereof, showing the shut-off gates in the open position;

FIG. 5. is a bottom perspective view of the metering assembly of the present invention, including the individual shut-off gates in both open and closed positions;

FIG. 6. is a top perspective view of the metering assembly of the present invention, including the individual shut-off gates in both open and closed positions;

FIG. 7. is a front view of the metering assembly of the present invention, showing gates in both opened and closed positions;

FIG. 8. is a side view of the air seeding apparatus of the present invention which supports a fertilizer tank and a seed tank showing the location of installation of the metering assembly;

FIG. 9. is a top plan view of an air seeding apparatus of the present invention depicting distribution lines that are open to the flow of fertilizer from the metering assembly;

FIG. 10. is a front view of an air seeding apparatus of the present invention depicting the soil openers in the lowered position;

FIG. 11. is a top plan view of an air seeding apparatus of the present invention, depicting distribution lines that are either open (white) or shut-off (black) to the flow of fertilizer and seed from the metering assembly;

FIG. 12. is a front plan view of an air seeding apparatus depicting the soil openers in both lowered and raised positions;

FIG. 13, is a cross-sectional side view of the agricultural implement of the present invention, showing the soil openers in the lowered position and pivotally mounted to a conventional frame;

FIG. 14. is a cross-sectional side view of the agricultural implement of the present invention, with the soil openers in the lowered position;

FIG. 15. is a cross-sectional side view of the agricultural implement of the present invention, with the soil openers in the raised position and pivotally mounted to a conventional frame.

FIG. 16. is a cross-sectional side view of the agricultural implement of the present inventions with the soil openers in the raised position;

FIG. 17. is a schematic of an electrical circuit for operating the air seeding apparatus of the present invention, showing all switches in the off position;

FIG. 18. is a schematic of the electrical circuit of the metering assembly of the present invention, showing switch 1 in the on position;

FIG. 19. is a schematic of a hydraulic circuit for operating the metering assembly of the present invention, showing all valves in the "off position;

FIG. 20. is a schematic of a hydraulic circuit for metering assembly of the present invention, showing valves IA and IB in the "on" position and remaining valves in the "off" position;

FIG. 21. is a perspective view of a metering assembly in another embodiment;

FIG. 22. is a perspective view of the metering assembly of FIG. 21. on a supply source;

FIG. 23. is an exploded perspective view of the metering assembly of FIG. 21;

FIG. 24. is a perspective view of a single supply receptacle of the metering assembly of FIG. 21. with a side removed so that the internal components of the metering device can be seen;

FIG. 25. is a side view of the supply receptacle of FIG. 24;

FIG. 26. is a front view of the supply receptacle of FIG. 24; and

FIG. 27. is a perspective side view of the supply receptacle of FIG. 24.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention, both as to its organization and manner of operation, may best be understood by reference to the following description and the drawings wherein numbers are used throughout several views to label like parts. Certain parts which are mentioned may be absent in particular figures due to the view of the drawing or obstruction by other parts.

An embodiment of a metering assembly 35 of the present invention is illustrated in FIGS. 1 to 8. The metering assembly 35 is comprised of a fluted or toothed metering roller 1 for ultimate distribution of particulate material to an agricultural implement. The metering roller 1 extends across the width of the metering assembly 35 and defines an axis. The metering assembly 35 is divided into a number of sections and the metering roller 1 is divided into a number of roll sections 3. Each roll section 3 corresponds with a portion of the metering roller 1 that extends through one of the sections. The metering roller 1 can be made of a variety of materials and have a variety of fluted or toothed configurations to correspond to the various crops that may need seeding. Upon forward movement of an air seeding system 200 the metering roller 1 rotates on a drive shaft 2 which causes particulate material including seed and fertilizer to be dispensed from a supply source 5 having a seed tank 96 and a fertilizer tank 98 to dispense at a predetermined rate through outlets in the fertilizer metering assembly 35*a* or seed metering assembly 35*b* and into distribution lines 27 (see FIG. 8) and ultimately dispensed by an air distribution system 27, 15, 18 through a plurality of ground-engaging openers 3 (FIGS. 13 to 16) and into soil. Each roll section 3 of the metering roller 1 will rotate and supply particulate material through the section of the metering assembly 35 the roll section 3 is in.

In a field where a pie shape or long strips of land remain unseeded or unfertilized and/or are narrower than the width of the seeding/fertilizing machinery, it would be optimal to turn off part of the seeding/fertilizing machinery to only seed/fertilize those areas that have not been seeded/fertilized rather than over-seed/fertilize or double-seed/fertilize a particular area and disturb an underlying seed bed.

One manner of accomplishing this, it to provide a plurality of gates 4 installed above the metering roller 1 which are able to move in either forward or rearward directions. In the forward direction each gate 4 prevents particulate material from being dispensed to that particular section of the metering roller 1 and acts as a barrier preventing the particulate material from contacting the metering roller 1. In the rearward position the gates 4 allows the particulate material to access the metering roller 1. A plurality of these gates 4 occur along the axis 33 of the metering roller 1 such that the metering roller 1 can be divided into sections and individual gates 4 can be engaged to provide a different length of the air seeding system to be blocked for seeding or fertilizing purposes.

As seen in FIGS. 2 and 4, a gate 4 is threadably connected to a first end of a shaft 7 above the metering roller 1. The shaft 7 is slidably attached to the internal surface of the rear and upper corner of an air seeding system hopper 5. Further, a second end of the shaft 7 is attached to an electric actuator, a hydraulic cylinder actuator, or an electric over hydraulic meter gate actuator 80. Further, each gate 4 is slidably connected to a metal plate 26, the plate 26 being connected to the upper, rear portion of an air seeding system hopper 5 by a variety of means which may include but are not limited to welded, soldered or bolted. The metal plate 26 serves as a guide for the gate 4 such that the plate's position relative to the gate 4 correctly positions the gate 4 over the metering roller 1 when engaged by the shaft 7. Further, when engaged by the shaft 7, the gate 4 is brought forward to engage the opposite end of the air seeding system hopper 5 such that particulate material cannot pass between the gate and the air seeding system hopper 5. When not engaged by the shaft 7, the gate 4 remains in a fixed position slidably attached to the metal plate 26. In this position, particulate material can pass between the gate 4 and the air seeding system hopper 5 and through to the metering roller 1 and then to distribution lines 27. From the distribution lines 27, the particulate material will ultimately pass to the ground-engaging openers 3 of an agricultural implement/air seeding apparatus 200 and into the soil.

FIGS. 5 to 7 show the shaft 7 differently engaged to produce an open gate 22 or a closed gate 23 when activated. Each gate 4 is ideally made of steel or another suitably strong metal. When in the forward (closed) position, the gate 23 completely prevents the metering roller 1 from accessing any particulate matter released from above the metering roller 1, In FIG. 2 the gate 4 can be clearly seen in its closed position 23 blocking all access of the particulate material to the metering roller 1. In FIG. 4 and FIG. 6 the opened gates 22 can best be seen in which a free flow of particulate matter to the metering roller 1 can occur.

An electric switch 101 in the cab of the vehicle (not shown) pulling the air seeding apparatus 200 is connected operatively to an electric actuator, hydraulic actuator or electric over hydraulic actuator 80 which is operatively connected to the second end of the shaft 7 to allow the operator to operate the metering assembly 35 and more specifically designate which gates 4 are to be open and which gates 4 are to be closed based on the operators knowledge of which soil is to be seeded/fertilized and which is to remain undisturbed. FIG. 17 shows a schematic of the electrical circuit 120 for operating the air seeding apparatus 200 of the present invention, which includes a plurality of switches 101, for operating corresponding electrical coils 102 which respectively operate corresponding hydraulic valves 202 to control hydraulic cylinder actuator 80 and thus gates 4 on metering device 35 (see FIG. 19), and such switches 101 further operate coils 104, which correspondingly control hydraulic valves 112 for controlling hydraulic cylinders 12 for raising and lowering respective opener arm assemblies 202 from engagement with soil.

FIG. 18 is an electrical schematic similar to FIG. 17, both figures showing an electrical circuit 120 for operating air seeding apparatus 200 of the present invention, which includes a plurality of switches 101 for operating corresponding electrical coils 102, Electrical coils 102 respectively operate corresponding hydraulic valves 111 to control gates 4 on the metering assembly 35 (see FIGS. 19 & 20).

Switches 101 of FIGS. 17 & 18 further and simultaneously operate coils 104 which correspondingly control hydraulic valves 112 for controlling hydraulic cylinders 12 for raising and lowering respective opener arm assemblies 202 from engagement with soil.

In this regard, FIG. 20 shows shank hydraulic cylinders 12 for groups of opener arm assemblies 202 (see "towers" IA & IB) in actuated position so as to cause associated opener assemblies 202 to be in the raised position. Remaining hydraulic cylinders 12 for remaining shank towers 2A, 3A, 4A, 5A, 6A1 7A & 8A, and 23, 3B, 4B, 5B, 6B, 7B, and 8B are shown in the position to effect lowering of associated opener arm assemblies 202.

In the electrical circuit 120 shown in FIG. 17, all switches 101 (eg, sw1-4) are shown in the "off" position. This causes associated hydraulic valves 112 to open and thereby cause corresponding hydraulic actuators 80 which control the metering gates 4 of the metering assemblies 35*a*, 35*b* to actuate the gates 4 to be in the "closed" position, and correspondingly control hydraulic valves 112 to cause hydraulic cylinders 12 to lower the opener arm assemblies 202 to engage soil (See FIG. 19, and FIG. 16).

In the electrical circuit 120 shown in FIG. 18, sw1 is shown in the "on" position and the remaining switches sw 2-4 are shown in the "off' position. As seen from FIGS. 18 and 2O due to sw1 being in the "on" position, corresponding coil 102 (coil 1A) activates meter shut-off valve 111 which correspondingly activates meter gate hydraulic actuator 80, so as to close meter gate 4. Simultaneously, switch 101 (sw) activates coil 108 (coil 1B), so as to activate hydraulic valves 112 (see FIG. 20) (valve 1B), which in turn operates hydraulic shank cylinders 12 for opener arm assembly 202 (shank cylinders 1A, 1B), so as to cause hydraulic shank cylinders 12 to raise opener arm assembly 202 to the raised position, as shown in FIG. 15 and in position 91 on FIG. 12.

While FIGS. 1-7 illustrates one embodiment of a metering assembly 35 to accomplish the selective supplying of particulate material to an air seeder apparatus 200, the selective supplying of particulate material to the air seeder apparatus 200 can be performed in a number of different ways. FIG. 21 illustrates a metering assembly 235 in another embodiment that allows the selective supplying of seed or other particulate material to an air seeding apparatus 200. The metering assembly 235 can be made up of a number of supply receptacles 236 as shown in FIG. 23. FIG. 22 illustrates the metering assembly 235 provided on the supply source 5. The metering assembly 235 can selectively dispense particulate material from the supply source 5, by supplying the particulate material at a desired rate to distribution lines 27 in lower portions 237 of the supply receptacle 236 when desired, and then stop supplying/dispensing the particulate material to the distribution lines 27 when desired. In this manner, the metering assembly 235 can be used to dispense particulate material from the supply source 5 when the air seeding apparatus 200 is in operation and then used to prevent or stop particulate material from being dispensed to the distribution lines 27 and the air seeding apparatus 200 when desired, such as, when the air seeding apparatus 200 is being turned around, the land being seeded is narrower than the air seeding apparatus 200, the land being seeded is odd-shaped, etc. This can be done to prevent overseeding, double seeding, unnecessary seeding, etc. of the land.

FIG. 23 illustrates a plurality of supply receptacles 236 forming the metering assembly 235. FIGS. 24-27 illustrate a single one of these supply receptacles 236. Each supply receptacles 236 can have an opening 203, a diverter plate 204, a roll section 201 of a metering roller 251 rotating on a drive shaft 202, a primary drive shaft 208, a first drive gear 212, a clutch assembly 220, a second drive gear 214 and a lower portion 237.

The roll section 201 can be generally cylindrical in shape and be made of a variety of materials. The roll section 201 can be provided in the supply receptacle 236 between the opening 203 of the metering assembly 235, where particulate material is supplied to the metering assembly 235, and a lower portion 237 of the supply receptacle 236, where the particulate material will be supplied to the distribution lines 27. The roll section 201 can rotate on the drive shaft 202, moving particulate material and supplying the particulate material to the lower portion 237 of the supply receptacle 236 and the distribution lines 27. The roll section 201 can also have a variety of fluted or toothed configurations to correspond to the various crops that may need seeding. The fluting or teeth can be used to aid the roll section 201 in gripping and moving particulate material so that it can be supplied to the lower portion 237 of the supply receptacle 236 and from there to the distribution lines 27.

In one aspect, a lip 205 can be provided in the supply receptacle 236. The lip 205 can be positioned within the metering assembly 235 so that in order to supply particulate material to the lower portion 237 of the supply receptacle 236, the roll section 201 must carry particulate material up and over the lip 205 before the particulate material can be supplied to the lower portion 237 of the supply receptacle 236 and the distribution lines 27. The lip 205 can aid in preventing particulate material from being supplied to the distribution lines 27 when the roll section 201 is not rotating.

The primary drive shaft 208 can be used to supply rotational motion to the drive shaft 202 that the roll section 201 is provided on. The primary drive shaft 208 can be ground driven, driven by a PTO from the towing vehicle (e.g. a tractor), etc. The primary drive shaft 208 can be operably connected to the first drive gear 212 by the clutch assembly 220 and the clutch assembly 220 can be used to selectively couple the primary drive shaft 208 to the first drive gear 212.

The second drive gear 214 can be connected to the drive shaft 202 that the roll section 201 is provided on and the second drive gear 214 can be placed in engaging contact with the first drive gear 212 so that rotation of the first drive gear 212 will cause rotation of the second drive gear 214.

The clutch assembly 220 can be used to couple the primary drive shaft 208 to the first drive gear 212 so that the rotational motion of the primary drive shaft 208 will be transferred through the first drive gear 212 and the second drive gear 214 to the drive shaft 202, causing the drive shaft 202 and the roll section 201 to rotate. When the clutch assembly 220 is used to de-couple the primary drive shaft 208 from the first drive gear 212, rotational motion will no longer be transferred to the roll section 201, the roll section 201 will stop rotating and particulate material will stop being supplied by the roll section 201 to the distribution lines 27.

In this manner, the clutch assembly 220 can be used to selectively control the supplying of particulate material to the distribution lines 27 by the supply receptacle 236. When the clutch assembly 220 is engaged and rotational motion is transferred to the roll section 201, the supply receptacle 236 can selectively supply particulate material to the lower portion 237 of the supply receptacle 236 and the distribution lines 27. However, when the clutch assembly 220 is disengaged, rotational motion will no longer be transmitted to the roll section 201 and the roll section 201 will stop rolling, preventing particulate material from being supplied to the distribution lines 27.

Although, the clutch assembly 220 is shown provided between the primary drive shaft 208 and the first drive gear 212 in FIGS. 21-27, a person skilled in the art will appreciate that the physical location of the clutch assembly 220 could be altered, such as placing it between the drive shaft 202 and the second drive gear 214, with the clutch assembly 220 still having the same ability to selectively transmit rotational motion to the roll section 201, causing the roll section 201 to rotate or to stop rotating.

In one aspect, the metering assembly 235 can have a single primary drive shaft 208, while the metering roller 251 is made up a number of drive shafts 202 and coaxial roll sections 201 spaced sequentially, with a separate drive shaft 202 and roll section 201 provided in each supply receptacle 236. In this manner, power can be supplied from the single primary drive shaft 208 to each of the separate drive shafts 202. With a clutch assembly 220 provided for each supply receptacle 236 between the single primary drive shaft 208 and the drive shaft 202 provided in the supply receptacle 236, each clutch assembly 220 can be operated separately from the other, coupling and decoupling each drive shaft 202 to the primary drive shaft 208 independently of the others, causing each supply receptacle 236 to selectively meter and supply particulate material to the air seeding apparatus 200 independently of the other supply receptacles 236.

Alternatively, a single clutch assembly 220 could be connected to a single drive shaft 202 passing through each of the roll sections 201 to selectively rotate all of the roll sections 201 or none of the roll sections 201.

In one embodiment the clutch assemblies 220 of the metering assembly 235 can be controlled by an operator inside a cab of a tow vehicle (not shown), such as by providing switches or buttons allowing the operator to engage and disengage the various clutch assemblies 220 as desired, starting and stopping the supply of particulate material to the air seeding apparatus 200 through the various supply receptacles 236. However, in another embodiment, the clutch assemblies 220 might be controlled by a GNSS navigation system, such as a GPS system, that disengages the clutch assemblies 220 and stops the section roll 201 from rotating when the GPS navigation system determines that the air seeding apparatus 200 is passing over fields that has already been seeded or should not be seeded.

In operation, when a field is being seeded with the air seeding apparatus 200, particulate material is provided from the supply source 5 to the metering assembly 235. The metering assembly 235 can meter and dispense the particulate material through each of the supply receptacles 236 to the distribution lines 27 to be supplied to the air seeding apparatus 200 and ultimately dispensed into the soil through the ground-engaging openers 3 on the air seeding apparatus 200 (FIGS. 13 to 16). Particulate material entering one of the supply receptacles 236 can be directed by the diverter plate 204 towards one side of the roll section 201 associated with that supply receptacle 236. As the roll section 201 rotates, the roll section 201 can move the particulate material and supply it to the lower portion 237 of the supply receptacle 236 and to the distribution lines 27. This can continue while the air seeding apparatus 200 is being used to seed and/or fertilize a field. However, when it is no longer desirable to supply particulate material, such as seed and fertilizer, to the air seeder 200, such as when it is passing over ground that has already been seeded, the ground it is passing over is not supposed to be seeded, etc., the metering assembly 235 can be used to selectively stop dispensing particulate material to the air seeding apparatus 200. The operator, GPS device, etc. can send a signal to the appropriate clutch assemblies 220 causing the clutch assemblies 200 to decouple the primary drive shaft 208 from the first gear 212 and stopping the roll sections 201 in the associated supply receptacles 236 from rotating. With the roll section 201 no longer rotating, particulate material will no longer be moved by the roll 201 and supplied from the supply receptacle 236 to the air seeding apparatus 200. When the air seeding apparatus 200 has crossed the ground and seeding of the ground is once again desired. The clutch assemblies 220 that were disengaged, can once again be engaged and the metering assembly 235 can once again be used to supply particulate material to the distribution lines 27 and to the air seeding apparatus 200.

If it is desirably to only stop supplying particulate material to a portion of ground-engaging openers 3 on the air seeding apparatus 200, the individual supply receptacles 236 supplying particulate material to that portion of the ground-engaging openers 3 can be prevented from supplying particulate material. Each of the supply receptacles 236 can be selectively operated independently from the others, allowing some of the supply receptacles 236 to continue to supply particulate material to the air seeding apparatus 200 which will dispense the particulate material using only some of the ground openers 3, while the other supply receptacles 236 are stopped from supplying particulate material to the air seeding apparatus 200. In this way, only a portion of the air seeding apparatus 200 will continue to dispense particulate material into the soil. This can be used when the air seeding apparatus 200 is wider than the ground to be seeded, requiring only a portion of the width of the air seeding apparatus 200 to be used for seeding.

FIGS. 8 to 12 shows an agricultural apparatus equipped with a seed metering assembly 35a and a fertilizer metering assembly 35b. From each metering assembly 35a, 35b, a plurality of distribution lines 27 are coupled such that an individual gate 4 within a metering assembly 35a, 35b will correspond to an individual distribution line 27. Each distribution line 27 is also coupled at its other end to a secondary distribution head 74. Alternatively, seed metering assembly 35a and fertilizer metering assembly 35b, shown in FIGS. 8 to 12, could be replaced with metering assemblies 235, as shown in FIGS. 21-27. A first metering assembly 235 could be used in place of the seed metering assembly 35a and a second metering assembly 235 could be used in place of the fertilizer metering assembly 35b. These metering assembly 235 could be connected to distribution lines 27 as shown in FIGS. 21-27.

Figure 9:
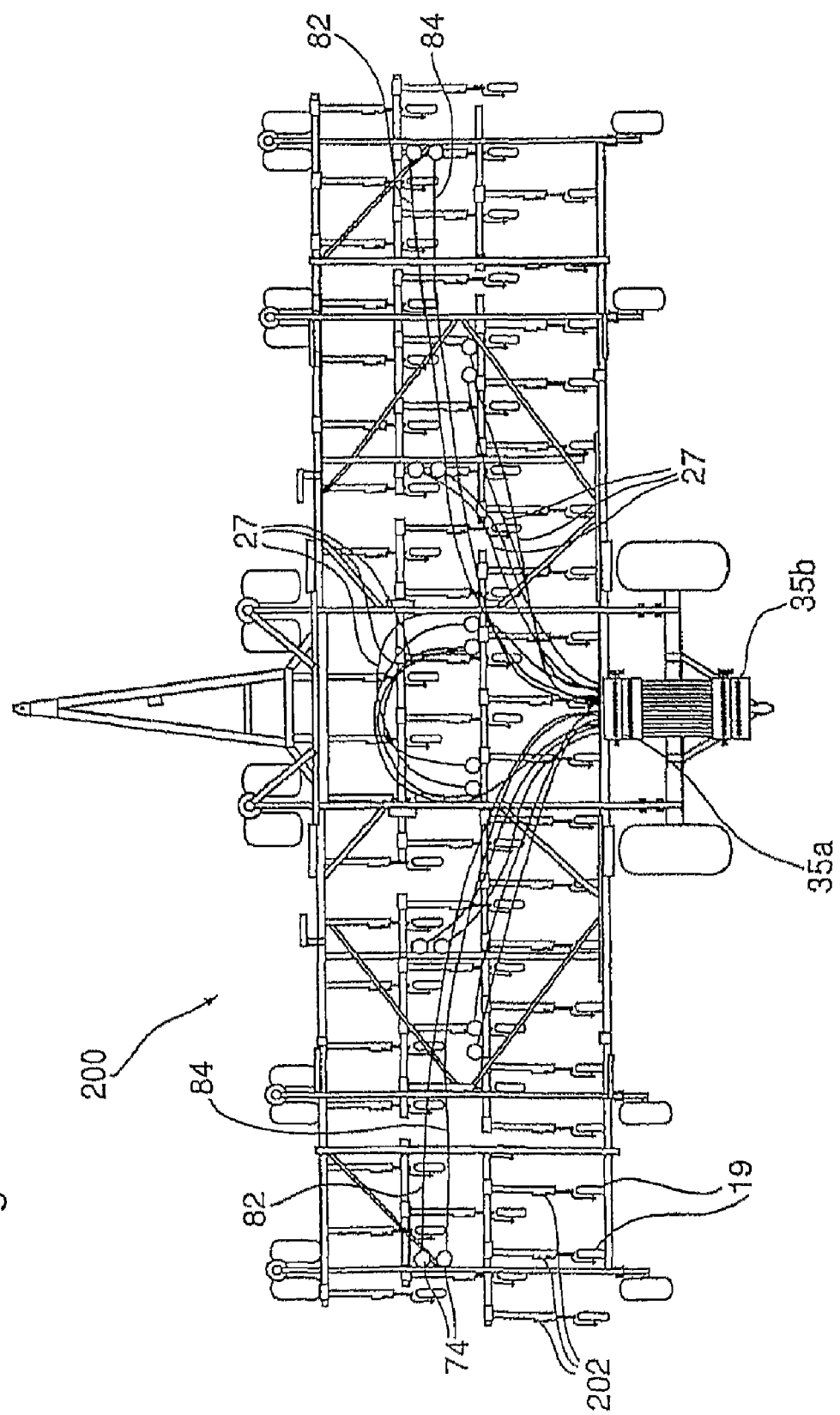
Figure 10:
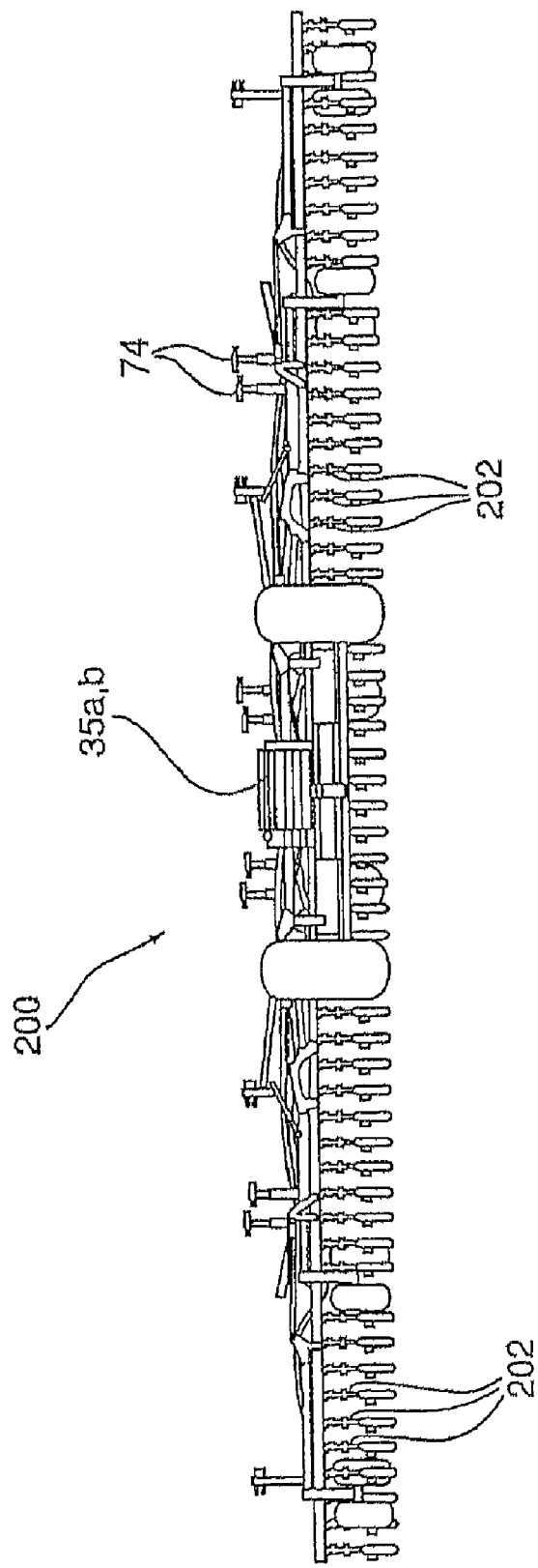

Each agricultural apparatus 200 has a plurality of secondary distribution heads 74. Each secondary distribution head 74 has a plurality of couplings to seed hoses 82 or fertilizer hoses 84. Each secondary distribution head 74 is then coupled at its other end to respective seed tube/hose 18 and fertilizer hose/tube 15 (see FIG. 9). Because the secondary distribution head 74 has a plurality of couplings to seed tube/hoses 18 or fertilizer tube/hoses 15, each gate 4 of metering assemblies 35a, 35b (or metering assemblies 235) can selectively open or close the supply of seed or fertilizer to a respective plurality of seed hoses 18 (in the case of a seed metering assembly 35a) and to a plurality of fertilizer tube/hoses 15 (in the case of a fertilizer metering assembly 35b). In FIG. 9 all of the distribution lines (white) depict seed and fertilizer hoses 82, 84 respectively open to the flow of fertilizer by a plurality of gates 4 in the seed metering assembly 35a, and fertilizer metering assembly 35b, respectively. Accordingly, in FIG. 10, all of the agricultural implements 200 are in the lowered position to allow the soil to be fertilized.

Figure 11:
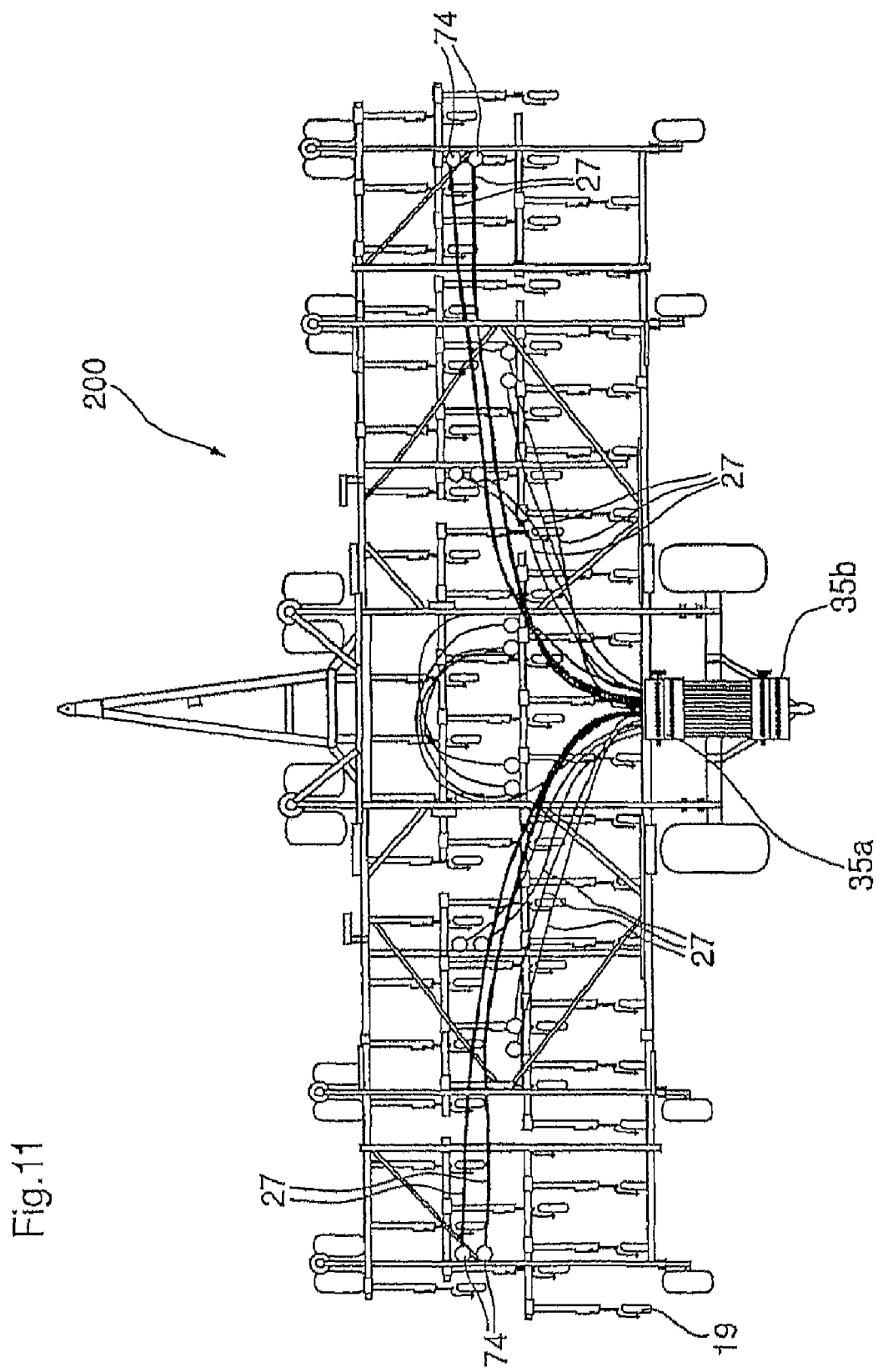

The black distribution lines in FIG. 11 depict seed hoses 82 and fertilizer hoses 84 shut-off to the flow of fertilizer by a plurality of gates 4 in the respective metering assemblies 35a, 35b or by stopping the rotation of the roll sections 201 in metering assembly 235, and the white distribution lines depict seed hoses 82 and fertilizer hoses 84 open to the flow of seed and fertilizer by a plurality of gates 4 in the respective seed and fertilizer metering assemblies 35a, 35b or by allowing the section rolls 201 to rotate in the metering assemblies 235. As such, a plurality of opener arm assemblies 202 will have seed and fertilizer distributed to them and a plurality of opener arm assemblies 202 will not have fertilizer or seed distributed to them.

Figure 12:
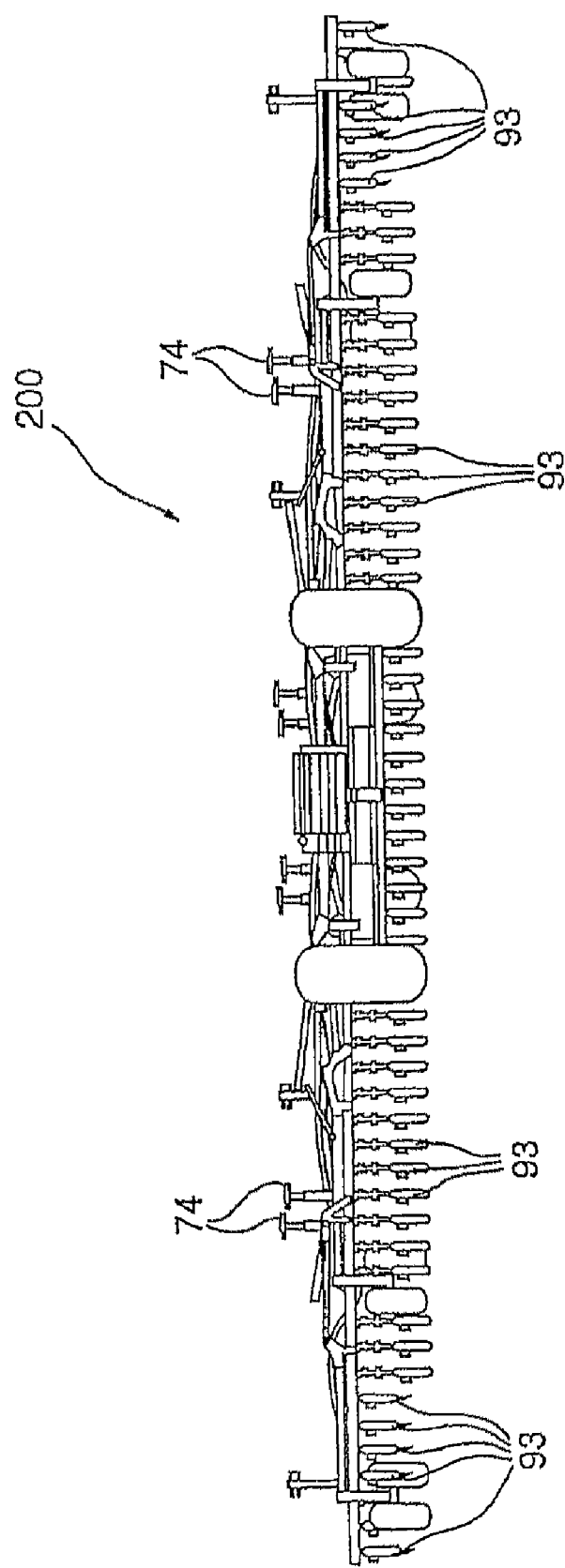
Figure 13:
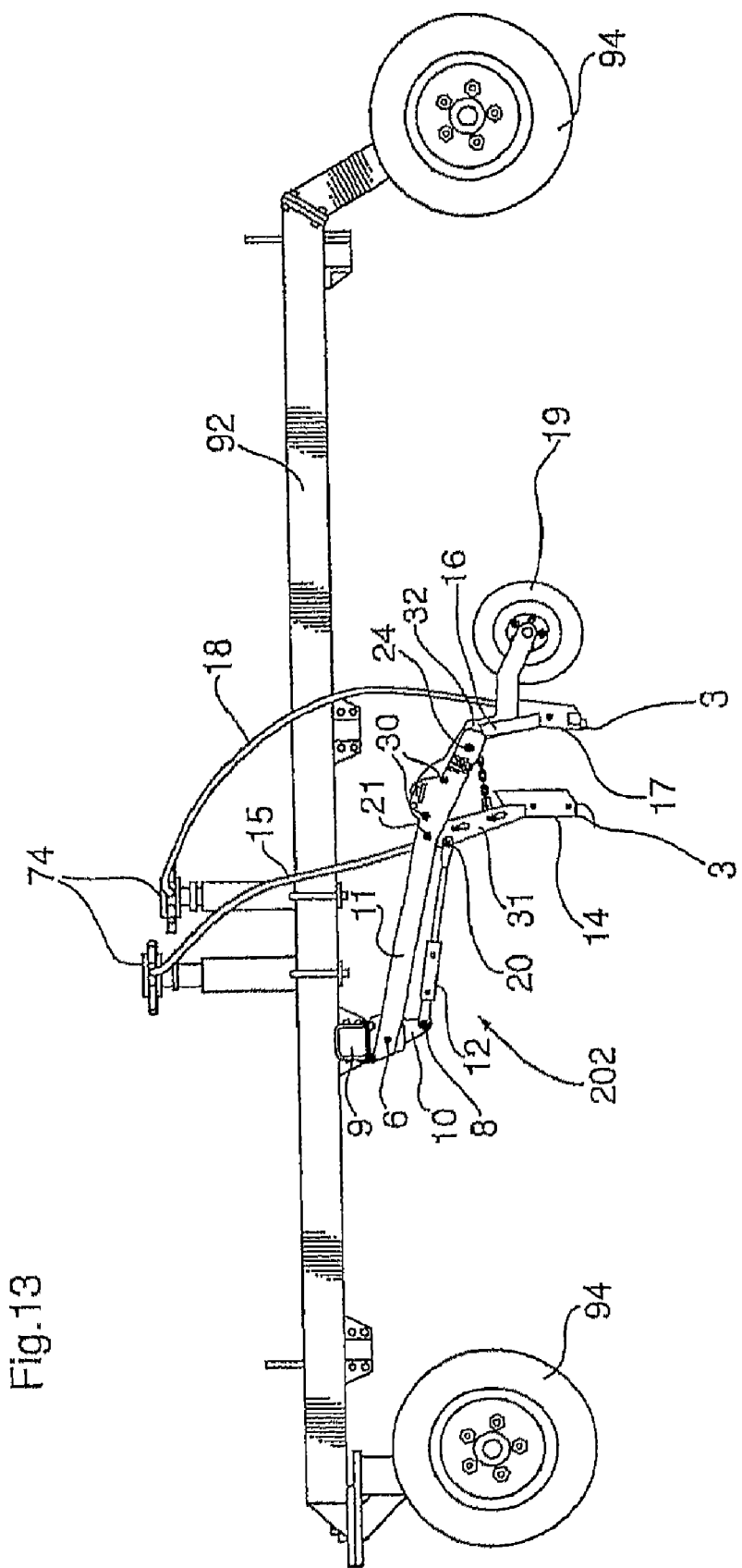
Figure 14:
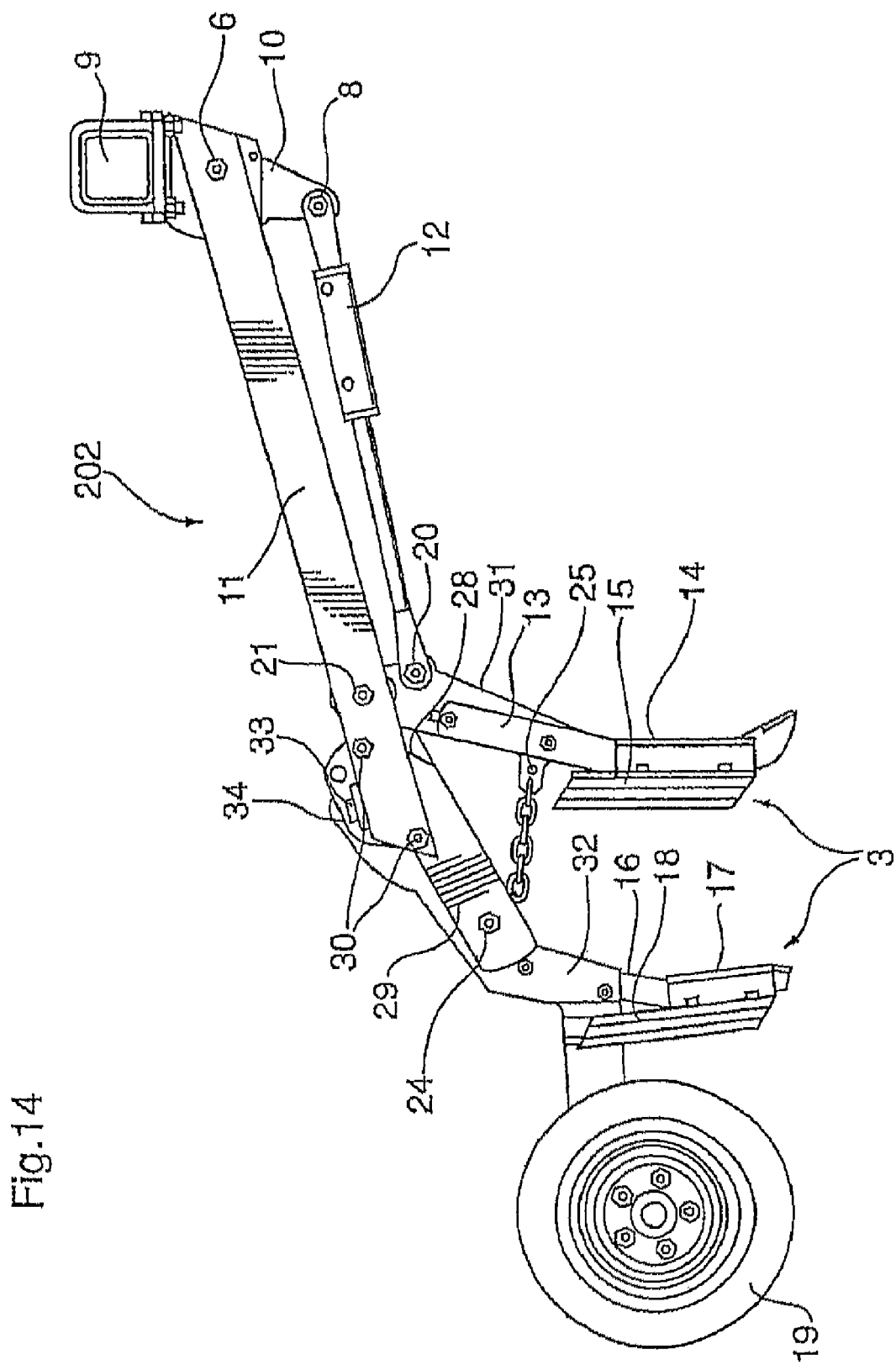

FIG. 12 depicts a group of opener arm assemblies 202 in the raised position 93 so that they do not disturb the soil. Fertilizer hoses 84 and associated fertilizer tubes/hoses 15, and likewise seed hoses 82 and corresponding seed hoses/tubes 18, all associated with the opener arm assemblies 202 which are in the raised position 93, are closed to the flow of seed/fertilizer. Other opener arm assemblies 202 are shown in the lowered position 93, and the associated fertilizer tubes/hoses 15 and seed tube/hoses 18 are provided with fertilizer and seed to permit operation of the remaining operable opener arm assemblies 202 shown in lowered position 93.

Further, in another embodiment a GNSS (Global Navigation Satellite System) such as a GPS (Global Positioning System) (not shown) is employed to automatically engage the electric actuator, hydraulic actuator, or electric over hydraulic cylinder actuator 80 and shaft 7 to close or open the gates 4 into a forward or rearward position, (or the clutch assemblies 220 if sectional metering assemblies 235 are used) based on previous data determining where the seed or fertilizer has been previously deposited in the soil, to ensure that double seeding/fertilizing or over seeding/fertilizer does not occur.

Figure 15:
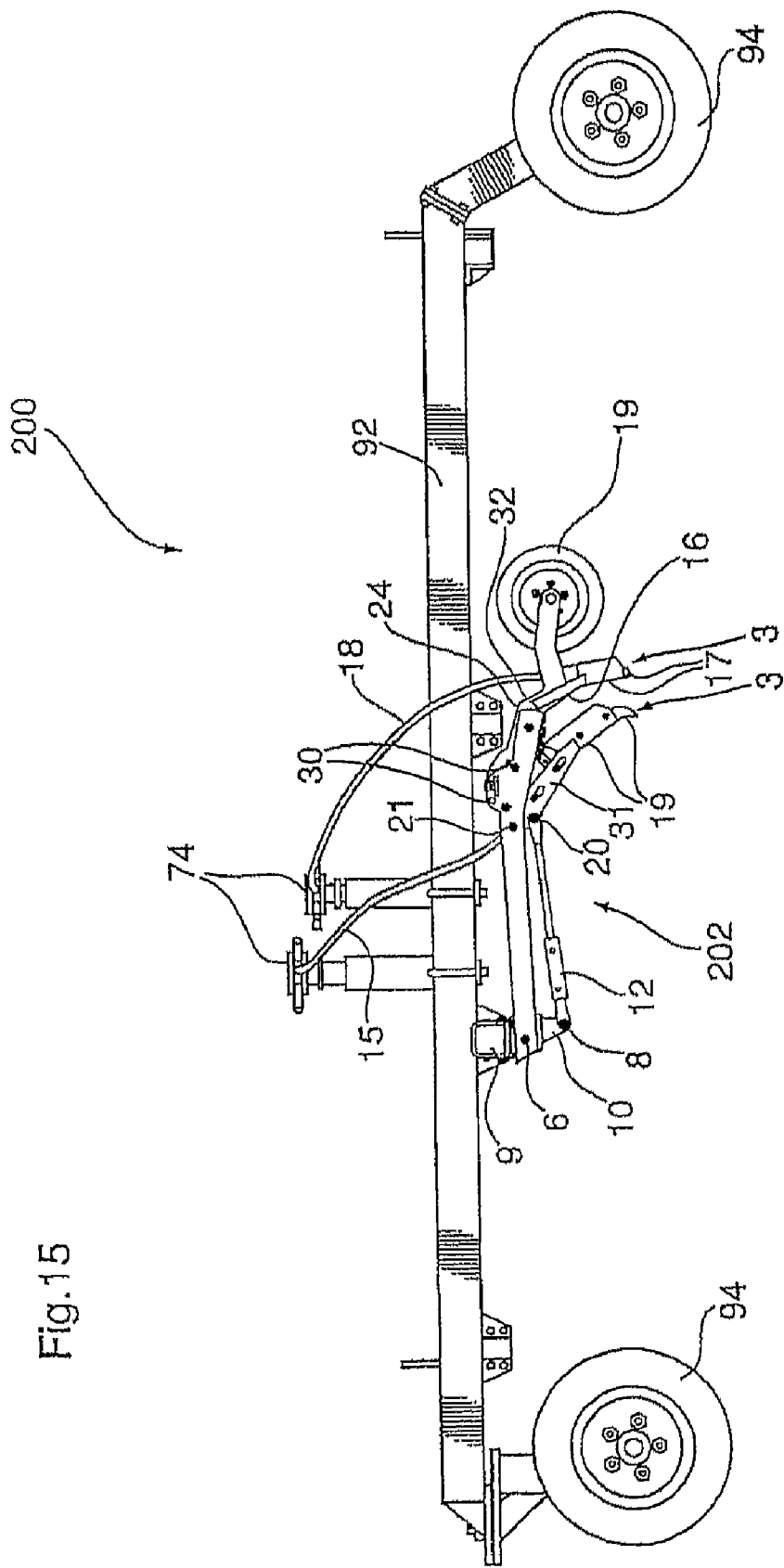
Figure 16:
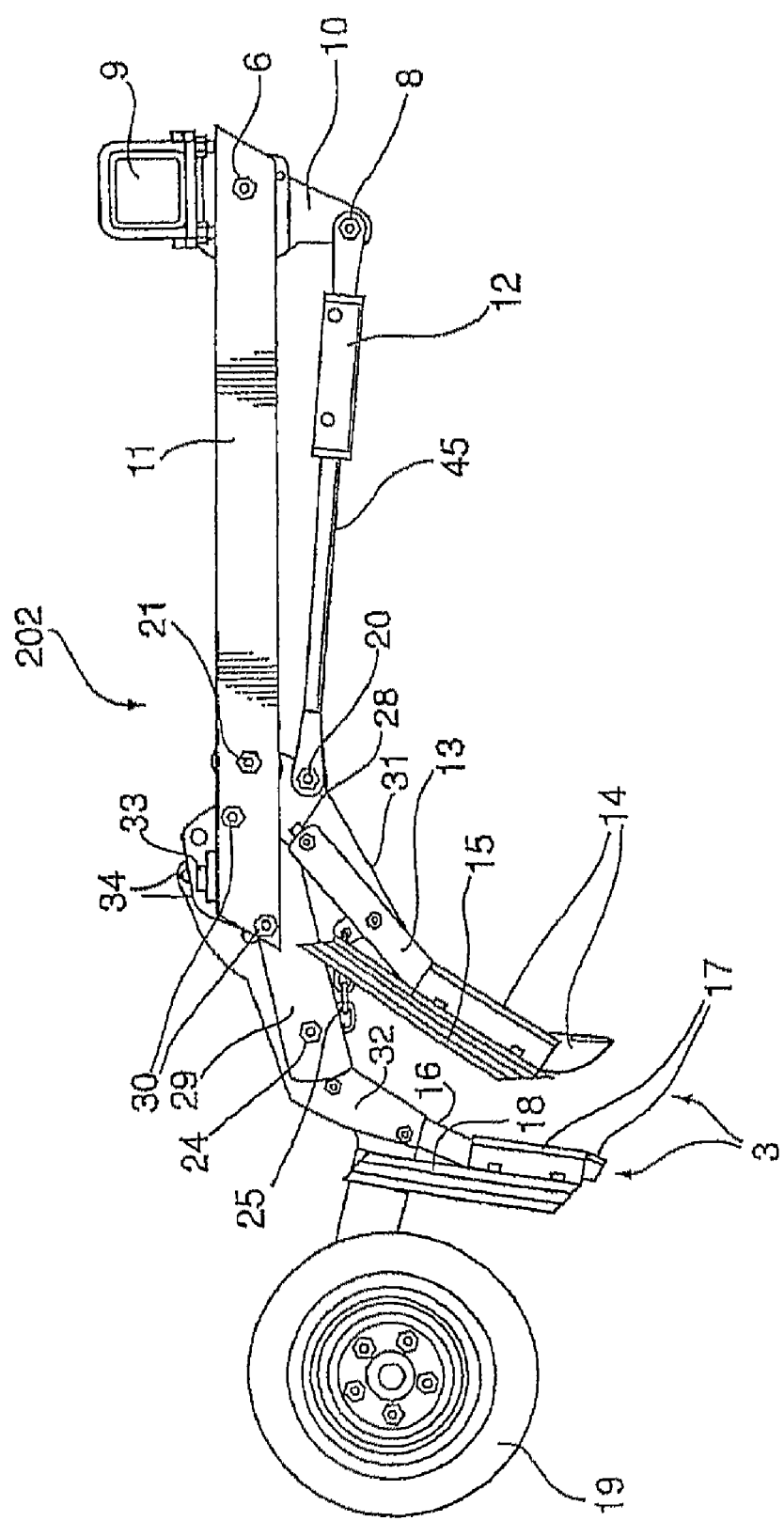
Figure 17:
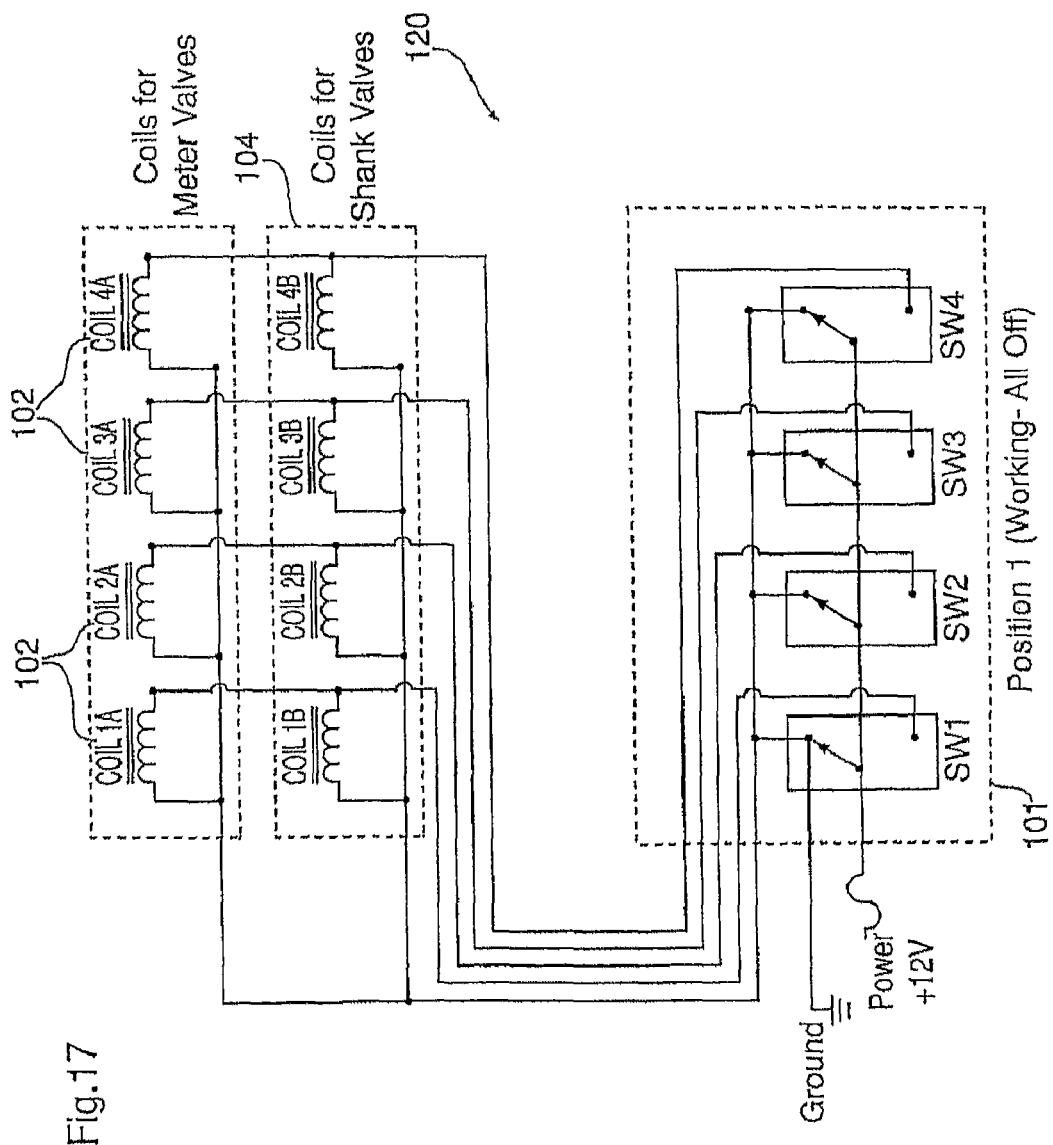
Figure 18:
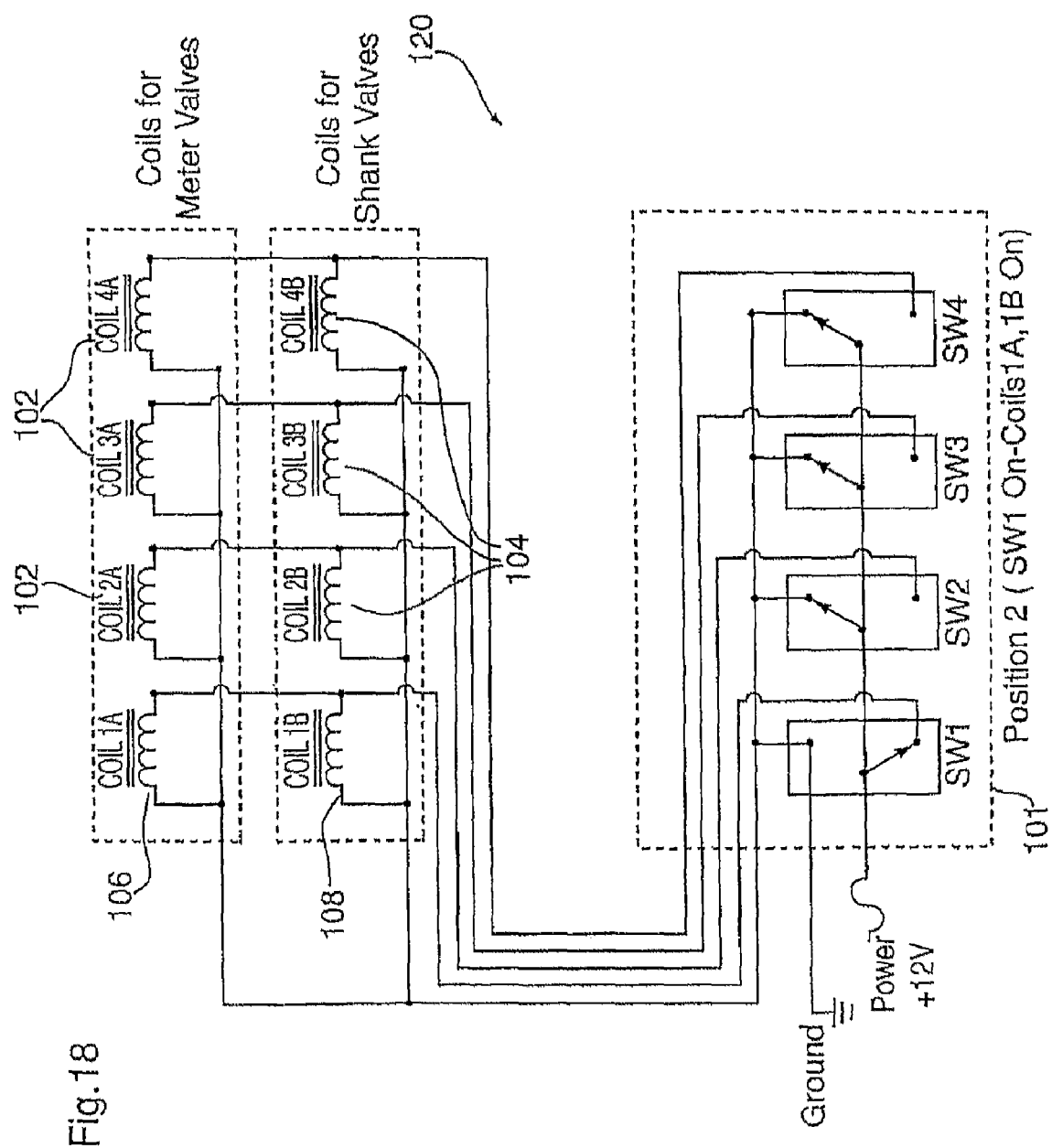

In a preferred but non-limiting embodiment, as seen in FIGS. 13 to 16 an agricultural implement 200 consists of an opener arm 11 pivotally mounted at pivot joint 6 to a cross-member 9 which is fixedly mounted to a conventional frame 92, The conventional frame 92 is operatively connected to a plurality of ground-engaging wheels 94. The opener arm mounting bracket 10 is fixedly mounted via cross-member 9 to conventional frame 92. Hydraulically extendable arm 45, containing a biasing hydraulic ram 12, is pivotably coupled at one end 8 thereof to opener arm mounting bracket 10, at another end 20 to seed opener arm 31, such that the biasing hydraulic ram 12 rests substantially parallel and below the opener arm 11, as shown in FIG. 16. First mounting member 31 is pivotably connected to opener arm 11 at pivotal joint 21, such that mounting member 31 is below and roughly perpendicular in the operating (soil engaging) position to opener arm 11. Hydraulic ram 12 may be extended to cause mounting member 31 to pivot rearwardly, and upon being so pivoted to contact opener arm 11, to cause opener arm 11 to pivot about pivot joint 6 so as to become raised, thereby raising the opener arm 11, packer wheel 19, first mounting member 31 (hereinafter collectively the opener arm assembly 202) from engagement with the ground.

First mounting bracket 31 is fixedly connected to the first delivery system mounting member 13. The first delivery system mounting member 13 contains the first cutting knife 14 as well as the first product (e.g. fertilizer) delivery hose/tube 15 (usually for delivering fertilizer) behind the first cutting knife 14. Distal to the first delivery system mounting member 13 is a second delivery system mounting member 16 connected below and to a second mounting member 32. The second mounting member 32 is fixedly connected at point 24 to a mounting arm extension 29. A pin 33 and plurality of bolts 34 also adjustably connects the second mounting member 32 to opener arm U. The pin and plurality of holes allow for vertical adjustment of the second delivery system mounting member 16. The second delivery system mounting member 16 is generally perpendicular to opener arm 11. The mounting arm extension 29 is rigidly connected to the opener arm 11 with two fixed bolts 30. The second delivery system contains a second cutting knife 17 as well as a second product (e.g. seed) delivery tube/hose 18 (usually for delivering seed) behind the second cutting knife 17. Both first and second delivery system members 13, 16, respectively, are collectively referred to as ground-engaging openers 3. A linked chain 25 connects the first and second ground-engaging openers 3 and limits the forward movement of the first ground-engaging opener.

A ground-engaging packer wheel 19 is connected to the distal end of the second mounting bracket 32. The packer wheel 19 follows the two delivery system mounting members 13, 16 and allows for packing of soil above the material which has been inserted in furrows created in the soil. The biasing hydraulic ram 12 is pivotally connected to both the frame mounting member 10 as well as the first mounting bracket 31 to be able to engage the first delivery system mounting member 13. When the hydraulic ram 12 is extended, the upper edge of the first delivery system mounting member 13 engages the front edge 28 of the mounting arm extension 29. The mounting arm extension 29 is then raised, thus raising the attached second delivery system mounting member 16, second pivot bracket 32 and packer wheel 19. The front edge 28 of the mounting arm extension 29 is sufficiently thick to support the weight of the second delivery system mounting member 16 as well as the second pivot bracket 32 and wheel 19 in a raised position for transport purposes. Reversing the hydraulic ram 12 by activating hydraulic shank valves 212 causes the corresponding opener arm assembly 202 to be lowered.

Figure 19:
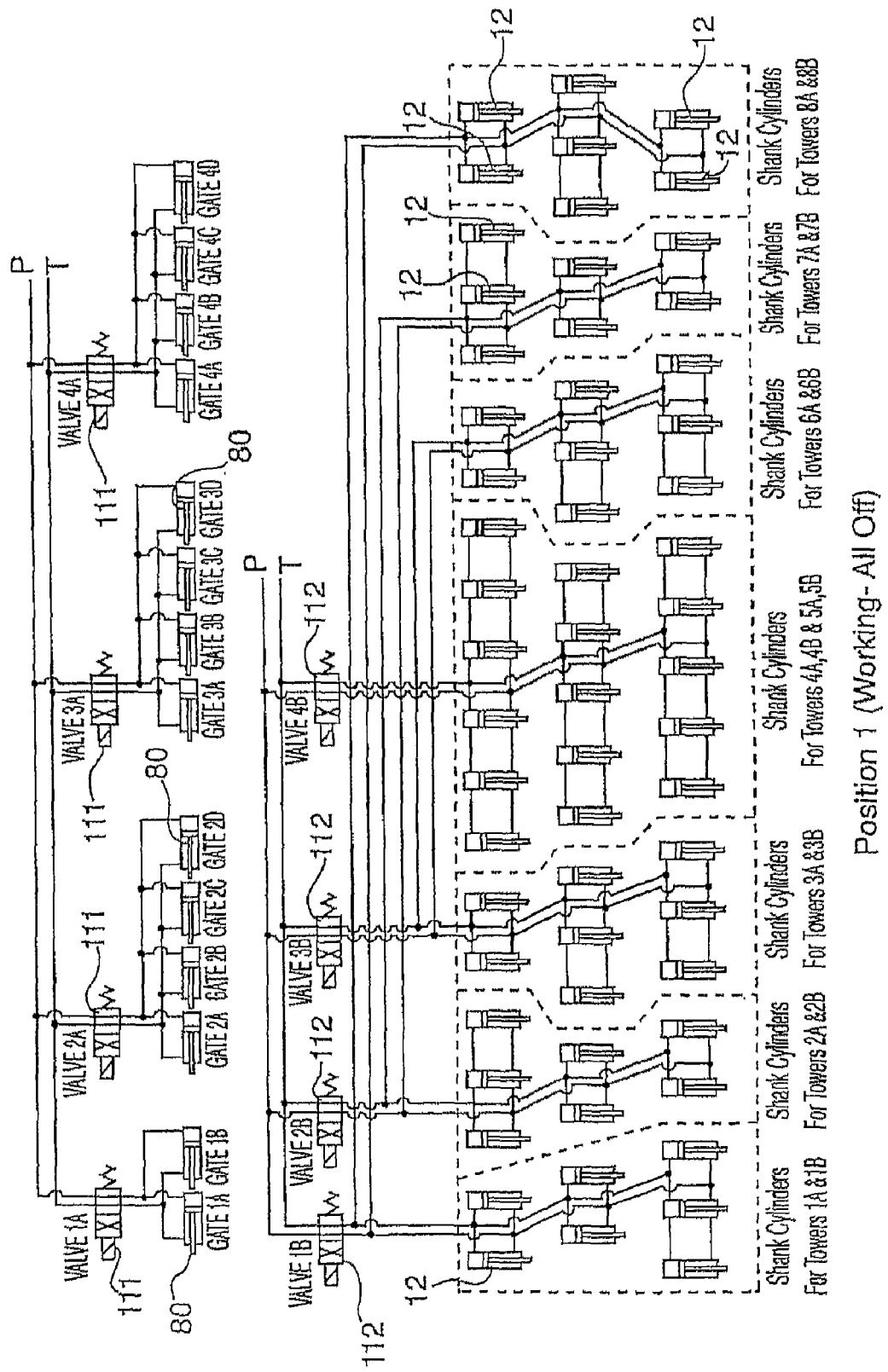
Figure 20:
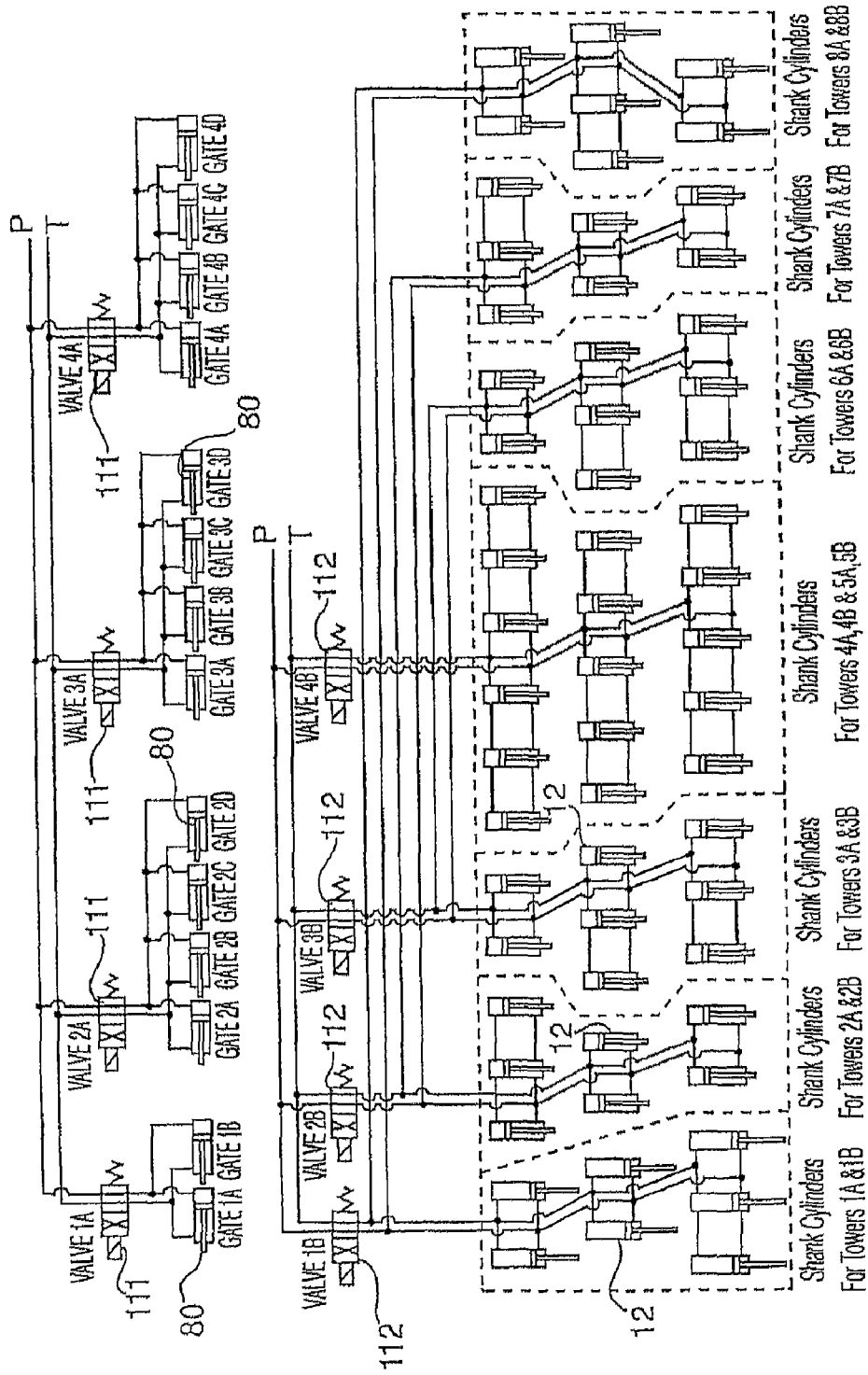

FIGS. 15 and 16 illustrates the agricultural implement 200 having the opener arm assemblies 202 in the raised position for transport. This allows for the agricultural implement 200 to be driven over a field that has been previously seeded without disturbing the seed bed. The biasing hydraulic ram 12 is controlled by a plurality of electric and/or hydraulic valves 112 (see FIGS. 19 & 20). This allows the operator to selectively raise either a single or multiple opener arm assemblies 202 from the cab of the vehicle.

The agricultural implement 200 of the present invention is also contemplated as being configured such that it comprises only a plurality of single ground-engaging openers 3 and corresponding product delivery hose/tubes 18 and cutting knives 17 such that the agricultural implement 200 only delivers seed or fertilizer.

In another important refinement of the present invention, a GNSS (global navigate satellite system) control system, such as a GPS control system, (not shown) is provided to automatically control the opening and closing of the gates 4 of the metering assemblies 35a, 35b or the engagement or disengagement of the clutch assembly 220 in the metering assemblies 235, as well as the raising and lowering of the opener arm assemblies 202 for the agricultural implement 200 of the present invention.

Specifically, such GNSS control system allows automatic control of not only coils 102 for controlling the meter valves 111 which in turn actuate/control hydraulic cylinder actuators 80 and thus associated gates 4 on metering assemblies 35a, 35b (or control the coupling/de-coupling of the clutch assemblies 220 of the metering assemblies 235, if metering assemblies 235 are used), but as well controls coils 104 for shank hydraulic valves 112, which in turn control the biasing hydraulic rams 12 on the opener arm assemblies 202 to raise selected opener arm assemblies 202 for areas that are mapped using the GPS system and known to already have be seeded, to thus prevent disturbing an already-planted seed bed. (see FIG. 19 and FIG. 20 herein).

In this regard, at least one GPS control system of the prior art may be specially adapted for the purpose of the present invention, namely the AutoSPRAY™ 7500 model controller manufactured by Rinex Corporation of South Perth, Western Australia (www.rinex.com.au/autosDrav.coin).

Specifically, the AutoSPRAY™ 7500 model controller and associated GPS receiver has been used in the prior art for controlling spray nozzles of agricultural sprayers (such as that depicted in U.S. Pat. No. 6,053,019 manufactured by Case Corporation (now Case/New Holland), used to apply herbicide or liquid fertilizer to crops.

In the manner that a GPS receiver of the prior art has been used to provide data and input to the prior art AutoSPRAY 7500 model controller, which in turn de-activates spray nozzles 22 located on booms 28, 30 of the device as shown in U.S. Pat. No. 6,053,019, where the GPS controller determines that portions of the crop have already been sprayed and activates solenoids to control (eg close) spray nozzles on booms 28, 30 to avoid "double-application" of herbicide, a GPS receiver and GPS controller such as the AutoSPRAY 7500 model controller may by used for the purposes of the present invention to control coils 102 which in turn control associated hydraulic cylinder actuators 111 which in turn control individual gates 4 on metering assemblies 35a, 35b, as well simultaneously control coils 104 is used to control hydraulic valves H2 and thereby control/actuate hydraulic ram cylinders 12 to effect appropriate raising of opener arm assemblies 202 when desired.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A method for selectively supplying a particulate material to an agricultural implement useful for dispensing the particulate material in the ground by means of a plurality of ground engaging openers mounted on a plurality of elongate pivotable mounting arms, each mounting arm adapted to be moved from a raised transport position to a lowered operating position, to avoid overlap, the method comprising:

feeding particulate material to a material metering device operable for metering and supplying the particulate material to a number of ground engaging openers of the agricultural implement;

stopping the material metering device from supplying a portion of the particulate material, said portion of the particulate material corresponding to an area of the ground where particulate material has already been dispensed, when the agricultural implement is traveling over the area of the ground where particulate material has already been dispensed;

raising those ground engaging openers that are not receiving the portion of the particulate material so that those ground engaging openers do not engage the ground where particulate material has already been dispensed; and when the agricultural implement is no longer traveling over the area of the ground where particulate material has already been dispensed, lowering those ground engaging openers and allowing the material metering device to once again supply the portion of the particulate material to the those ground engaging openers.

2. The method as claimed in claim 1, wherein said portion of particulate material is less than the total amount of the particulate material capable of being metered by the material metering device to the agricultural implement.

3. The method as claimed in claim 1, whereby the material metering device is stopped from supplying the portion of the particulate material to the agricultural implement by means of at least one gate, said at least one gate having an open position allowing the portion of particulate material to be dispensed and a closed position stopping the portion of particulate material from being dispensed.

4. The method as claimed in claim 1, wherein the material metering device comprises a metering roller having a plurality of roll sections, whereby the material metering device is stopped from supplying the portion of the particulate material to the agricultural implement by stopping the rotation of a number of roll sections which sections would have ordinarily metered the portion of particulate material.

5. The method as claimed in claim 4, wherein the rotation of the roll sections is stopped by means of at least one clutch assembly, said at least one clutch assembly operative to transmit rotational motion to the metering roller and the roll sections causing the roll sections to rotate and meter particulate material and to selectively stop transmitting rotational motion to the roll sections causing the roll sections to stop rotating and preventing the portion of the particulate material to be metered to the agricultural implement.

6. The method as claimed in claim 5 wherein each roll section is operably associated with its own clutch assembly such that each clutch assembly can selectively transfer and stop transferring rotational motion to the associated roll section.

7. The method as claimed in claim 6 wherein each of the clutch assemblies is independently controllable allowing the selected number of roll sections to be stopped from rotating while the rest of the roll sections continue to rotate.

8. The method as claimed in claim 1, whereby the portion of particulate material is stopped in response to input from a GPS or GNSS satellite navigation system as a result of having determined the area of the ground where particulate material has already been dispensed.

* * * * *